(12) United States Patent
Kanno et al.

(10) Patent No.: US 9,769,428 B2
(45) Date of Patent: Sep. 19, 2017

(54) IMAGE PROCESSING DEVICE WITH FUNCTION FOR AUTOMATICALLY ADJUSTING SEARCH WINDOW

(71) Applicant: FANUC Corporation, Minamitsuru-gun, Yamanashi (JP)

(72) Inventors: Ichiro Kanno, Yamanashi (JP); Toshiyuki Ando, Yamanashi (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 248 days.

(21) Appl. No.: 13/756,718

(22) Filed: Feb. 1, 2013

(65) Prior Publication Data
US 2013/0201346 A1    Aug. 8, 2013

(30) Foreign Application Priority Data
Feb. 3, 2012 (JP) ................................. 2012-021997

(51) Int. Cl.
*H04N 7/18* (2006.01)
*G06F 19/00* (2011.01)
(Continued)

(52) U.S. Cl.
CPC .............. *H04N 7/18* (2013.01); *B25J 9/1697* (2013.01); *G06T 7/70* (2017.01);
(Continued)

(58) Field of Classification Search
CPC ......... B25J 9/1697; G05B 2219/45063; G06T 2207/20081; G06T 2207/30164; G06T 7/004; G06T 7/00; H04N 7/18
See application file for complete search history.

(56) References Cited

U.S. PATENT DOCUMENTS

| 7,177,459 B1 | 2/2007 | Watanabe et al. |
| 7,593,571 B2 | 9/2009 | Wakabayashi |

(Continued)

FOREIGN PATENT DOCUMENTS

| CN | 101081512 A | 12/2007 |
| EP | 1 816 604 | 8/2007 |

(Continued)

OTHER PUBLICATIONS

Fuchs et al., "Cooperative Bin-Picking with Time-of-Flight Camera and Impedance Controlled DLR Lightweight Robot III," 2010 International Conference on Intelligent Robots and Systems, Oct. 18-22, 2010, Tokyo, Japan, pp. 4862-4867.
(Continued)

*Primary Examiner* — Jorge L. Ortiz Criado
*Assistant Examiner* — Yong Joon Kwon
(74) *Attorney, Agent, or Firm* — Drinker Biddle & Reath LLP

(57) ABSTRACT

An image processing device according to the present invention includes container reference position and posture setting unit for setting a position and posture to be a reference for the container, workpiece reference height setting unit for setting a height to be a reference for the workpiece, a reference search window setting unit, container position and posture acquisition unit, a workpiece height calculation unit a search window calculation unit for calculating an amount of adjustment of the search window from the reference container position and posture, the workpiece reference height, the container position and posture, and the workpiece height, and calculating the search window from the reference search window and the amount of adjustment of the search window, and workpiece detection unit for detecting the workpiece from the image using the calculated search window.

5 Claims, 15 Drawing Sheets

(51) Int. Cl.
*G06K 9/00* (2006.01)
*B25J 19/04* (2006.01)
*B25J 9/16* (2006.01)
*G06T 7/70* (2017.01)

(52) U.S. Cl.
CPC ............ *G05B 2219/45063* (2013.01); *G06T 2207/20081* (2013.01); *G06T 2207/30164* (2013.01)

(56) References Cited

U.S. PATENT DOCUMENTS

| | | |
|---|---|---|
| 7,996,114 B2 | 8/2011 | Ban et al. |
| 2002/0169522 A1* | 11/2002 | Kanno ............... 700/245 |
| 2007/0177790 A1 | 8/2007 | Ban et al. |
| 2010/0004778 A1* | 1/2010 | Arimatsu et al. ........ 700/214 |
| 2011/0150286 A1* | 6/2011 | Ishigami et al. ........ 382/106 |

FOREIGN PATENT DOCUMENTS

| | | |
|---|---|---|
| JP | 1147676 A | 6/1989 |
| JP | 05-204992 | 8/1993 |
| JP | 2001-179677 A | 7/2001 |
| JP | 2006-049347 A | 2/2006 |
| JP | 2007-203406 A | 8/2007 |
| JP | 2011-133273 A | 7/2011 |
| JP | 2012-024903 A | 2/2012 |
| JP | 2013-101045 A | 5/2013 |
| WO | WO-2009-025271 A2 | 2/2009 |

OTHER PUBLICATIONS

S. Ravela, "Tracking Object Motion Across Aspect Changes for Augmented Reality," Computer Science Department Faculty Publication Series, University of Massachusetts, Amherst, Paper 220., 1996, (9 pages).

* cited by examiner

IMAGE PROCESSING DEVICE WITH FUNCTION FOR AUTOMATICALLY ADJUSTING SEARCH WINDOW

This application is a new U.S. patent application that claims benefit of JP 2012-021997, filed on Feb. 3, 2012, the content of JP 2012-021997 is incorporated herein by reference.

FIELD OF THE INVENTION

The present invention relates to an application for photographing workpieces that are randomly stacked in a container and detecting the workpieces by an image processing device, and an application for photographing the workpieces with a hand-held camera that is mounted at the top of a robot and detecting the workpieces with the image processing device. More particularly, the present invention relates to an image processing device that is directed to preventing workpieces from being misdetected or undetected and reducing the processing time for workpiece detection by adjusting the search window to use when detecting the workpieces by the image processing device.

BACKGROUND OF THE INVENTION

In a state where workpieces, which are objects to detect, are not properly positioned but placed randomly in a container, an application for picking up the workpieces, commonly referred to as "random bin picking," detects the workpieces by a camera that photographs a wide range, in order to acquire position information with respect to a workpiece to pick up. At this time, a search window used for detecting the workpieces is fixed and set inside the container in which the workpieces are accommodated. However, when, for example, the position of the container is changed by replacing the container, or the height of workpieces that can be detected changes due to the increase or decrease of the number of workpieces, the position and size of the search window becomes inadequate. Then, problems occur where, for example, workpieces are not found in the search window, unwanted objects are captured in the search window and cause misdetection, the search window is too large and the detection consumes additional time, and so on.

Furthermore, an application for "random bin picking" might operate such that, after a rough position of a workpiece is obtained by a fixed camera that photographs a wide range, information about the accurate position of the workpiece is acquired by a hand camera that is mounted in a robot, and the workpiece is picked up. At this time, the robot calculates the position to photograph the workpiece by the hand camera, based on the rough position of the workpiece acquired from the image photographed by the fixed camera, and tries to move to the position determiend by the calculation. However, when the robot moves to the position to photograph the workpiece by the hand camera, the hand camera and the hand that are mounted in the robot, and the peripheral system equipment, including the container in which the workpiece is accommodated, interfere with each other, and the workpiece may be photographed from a position where interference is avoided. Then, given that the workpiece is photographed by the hand camera in a different robot position and posture from the setting, problems occur where, for example, the workpiece is not found in the search window, unwanted objects are captured in the search window and cause misdetection, the search window is too large and the detection consumes additional time, and so on.

A scheme for teaching a plurality of windows that detect the features of a workpiece from an image, and determining which window to use according to an input from an external device, is known (see, for example, patent literature 1). Furthermore, based on a method of detecting the edges of the components mounted on a substrate, a component edge detection method and device characterized in that, when detecting the edge of a component in the first edge detection step and a second edge detection step, in the second edge detection step, adjusting the position and size of the search window to to be used in the second edge detection step using the edge position detected in the first edge detection step (see, for example, patent literature 2).

Patent Literature 1: JP-A-1-147676
Patent Literature 2: JP-A-2006-49347

The search window control scheme illustrated in patent literature 1 is effective in that, when the amounts of displacement of the container and the robot are determined in advance, a corresponding search window has only to be set. However, when the amounts of displacement are not determined in advance, an enormous number of search windows have to be set in order to cope with all possible situations, which is not suitable for practical use. Furthermore, with the component edge detection method and device illustrated in patent literature 2, the position and size of the search window used in the second edge detection are adjusted based on the detected position of the first edge in the same component. However, if many workpieces that are stacked randomly in a container are detection targets, a search window does not have to be provided for every workpiece, and only one search window that covers a necessary and sufficient area inside the container depending on the amount of displacement of the container has to be provided. With the method of patent literature 2, it is not possible to create such a desirable search window. In addition, it is not possible to adequately change the size of the search window depending on the height of the contents stacked in the container. Furthermore, if the hand camera is shifted from the teaching position to avoid interference, a search window to reflect the amount of this shift is needed. With the method of patent literature 2, it is not possible to create such a search window.

SUMMARY OF THE INVENTION

An image processing device according to an embodiment photographs an image by a camera, sets a search window, in the image, as a range to detect an object that is accommodated in a containing means from the image, and detects the object, and the image processing device includes: a means for setting an accommodating means reference position and posture for setting a position and posture to be a reference for the accommodating means, a means for setting an object reference height for setting a height to be a reference for the object, a means for setting a search window that is set such that the object can be detected when the accommodating means is in the accommodating means reference position and posture and the object is at the object reference height, as a reference search window, a means for acquiring the position and posture of the accommodating means when the object is photographed, as an accommodating means position and posture, a means for estimating a height of the object when the object is photographed, as an object height, a means for calculating an amount of adjustment of the search window from the accommodating means reference position and posture, the object reference height, the accommodating means position and posture and the object height, and calculating the search window from the reference search window and the amount of adjustment of the search window, and a means for detecting the object from the image using the calculated search window.

With an image processing device according to one embodiment, it is preferable to calculate the object reference height or the object height based on the detected size of the object.

An image processing device according to another embodiment photographs an image by a camera, sets a search window, in the image, as a range to detect an object from the image, and detects the object, and the image processing device includes a means for setting a reference robot position and posture for setting a position and posture to be a reference for a robot, a means for setting a search window that is set such that the object can be detected when the robot is in the reference robot position and posture, as a reference search window, a means for acquiring the position and posture of the robot when the object is photographed, as a robot position and posture, a means for calculating an amount of adjustment of the search window from the reference robot position and posture and the robot position and posture, a means for calculating a search window from the reference search window and the amount of adjustment of the search window, and a means for detecting the object from the image using the calculated search window.

With an image processing device according to another embodiment, when the robot interferes with the accommodating means in which the object is accommodated and the peripheral system equipment, it is preferable to set the robot position and posture in a position and posture in which the robot, and the accommodating means and the peripheral equipment do not interfere with each other.

According to the present invention, an object can be detected using a search window that is adjusted in accordance with the amount of displacement of the accommodating means and the height of the object, so that, problems that, for example, the object is not found in the search window, unwanted objects are captured in the search window and cause misdetection, the search window is too large and the detection consumes additional time and so on, do not occur.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The present invention will be illustrated below with reference to the accompanying drawings. Note that the technical scope of the present invention is by no means limited to the embodiments herein and covers the inventions recited in the claims and their equivalents. The terminology used herein is for the purpose of describing particular embodiments only and is not intended to be limiting of the general inventive concept.

As used herein, the singular forms "a", "an" and "the" are intended to include the plural forms as well, unless the context clearly indicates otherwise.

(First Embodiment)

Figure 1:
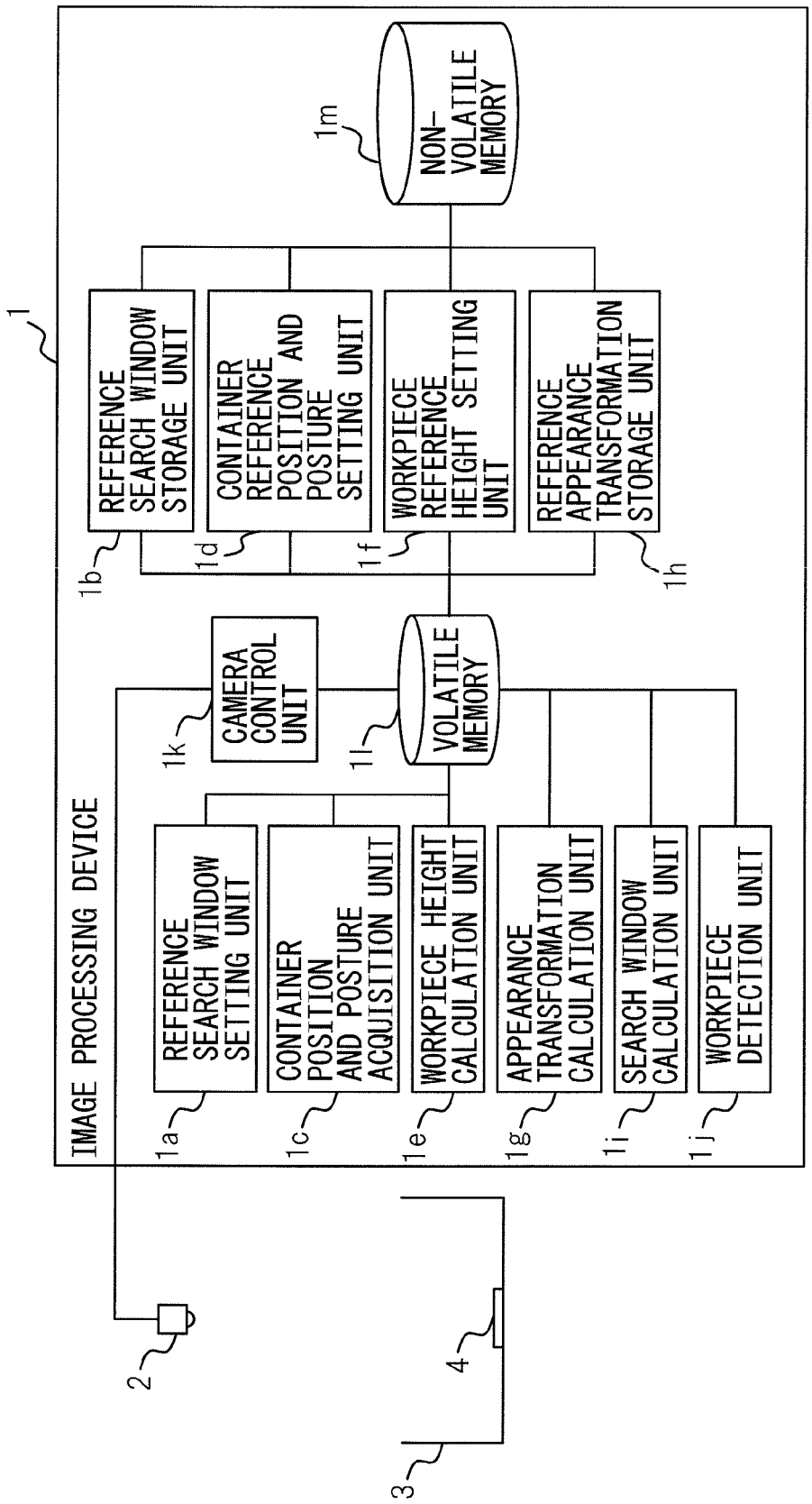
FIG. 1 is a diagram illustrating a schematic configuration of an image processing device which has a function of automatically adjusting a search window using the amount of change of the position and posture of a container and the height of a workpiece, according to a first embodiment.

First, an image processing device according to the first embodiment will be illustrated. FIG. 1 is a diagram illustrating an overall configuration of an image processing device 1 according to the first embodiment. In a container 3 which is accommodating means, a workpiece 4 which is an object to detect is accommodated.

A fixed camera 2 which is fixed and set above the container 3 and which photographs the workpiece from a fixed position and posture, is connected to a camera control unit 1*k* inside the image processing device 1, and photographs the workpiece 4 accommodated in the container 3 provided in the view of the fixed camera 2. As will be illustrated later, the image processing device 1 sets up a search window as the range to detect the workpiece 4, in an image acquired by photographing, and detects the workpiece 4 that is present in the search window in the image. The image processing device 1 includes: a container position and posture acquisition unit 1c as a means for acquiring the position and posture of the container as the container position and posture; a workpiece height calculation unit 1e as a means for calculating the height of the workpiece as the workpiece height; a container reference position and posture setting unit 1d as a means for setting a container reference position and posture for setting the position and posture to be the reference for the container 3; a workpiece reference height setting unit 1f as a means for setting a workpiece reference height for setting the height to be the reference for the workpiece 4; a reference search window setting unit 1a as a means for setting a search window which can detect the workpiece 4 accommodated in the container 3 when the container 3 is in the reference position and posture and the workpiece 4 is at the workpiece reference height; an appearance transformation calculation unit 1g as a means for finding the appearance transformation on an image (which will be illustrated later in detail); a reference appearance transformation storage unit 1h as a means for storing the appearance transformation on an image to be the reference, as the reference appearance transformation on the image; and a search window calculation unit 1i as a means for calculating the amount of adjustment of the search window from the container reference position and posture, the workpiece reference height and the workpiece height, and calculating a search window from the reference search window and the amount of adjustment of the search window. The reference search window, the container reference position and posture, and the workpiece reference height are stored in advance when the reference data is taught. The search window is calculated by way of adjusting the reference search window using the container reference position and posture and the workpiece reference height that are stored when the reference data is taught, and the container position and posture and the workpiece height that are acquired when executing the workpiece detection.

Figure 2:
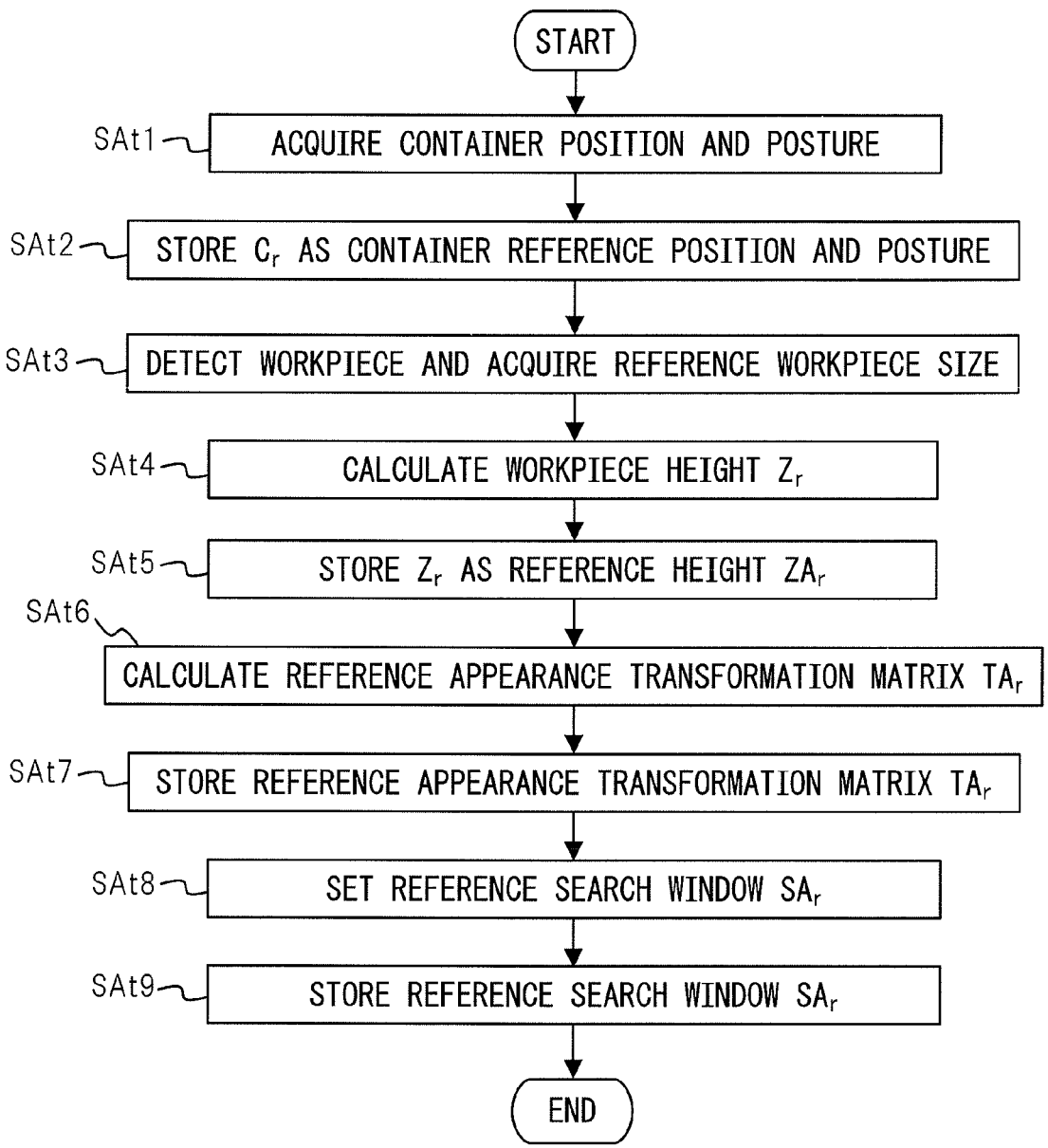
FIG. 2 is a flowchart illustrating the steps of setting a reference search window, in the image processing device according to the first embodiment.
Figure 6:
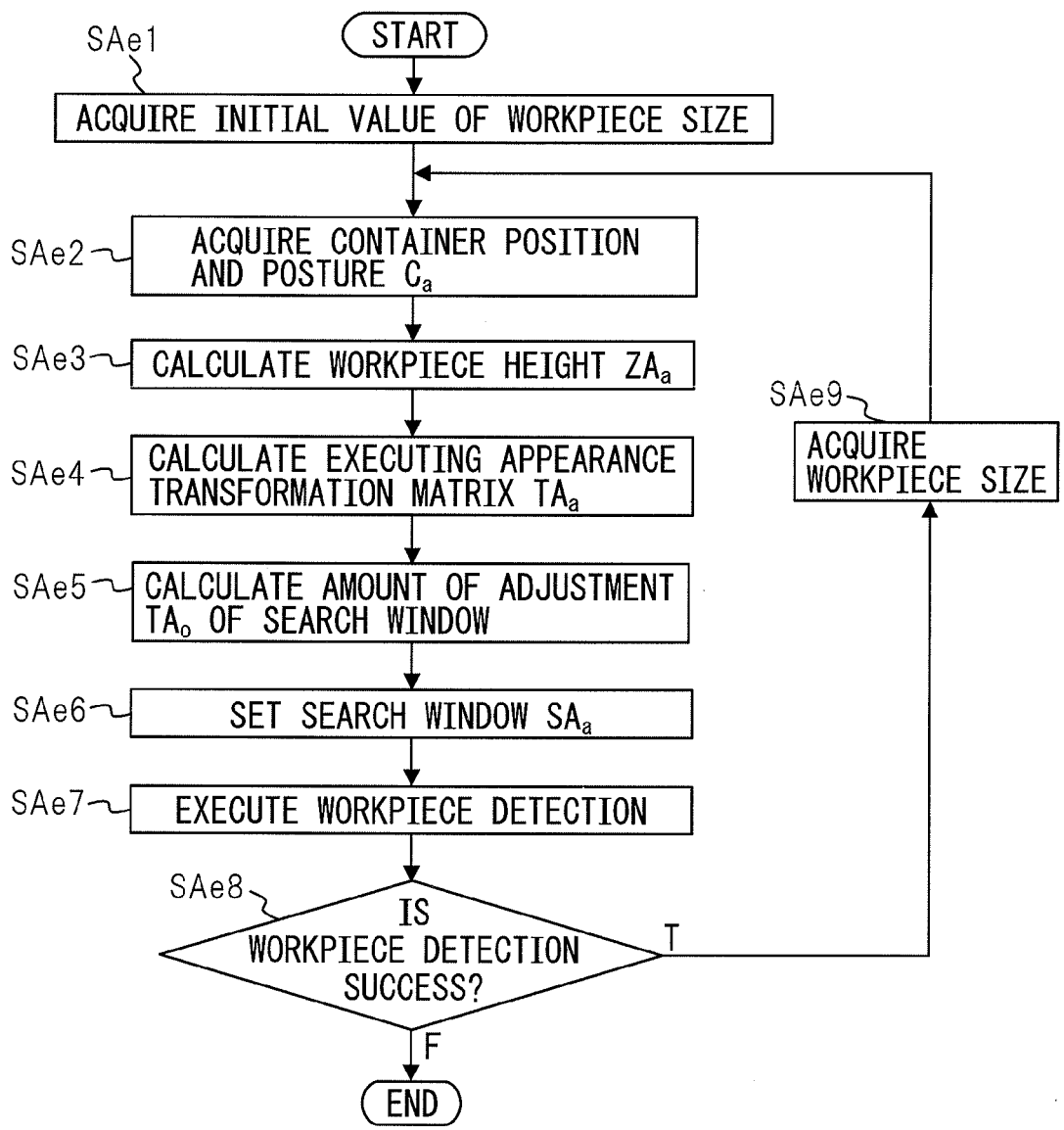
FIG. 6 is a flowchart illustrating a preferable example of a process of detecting a workpiece by automatically adjusting a search window using the amount of change of the position and posture of a container and the height of a workpiece, according to the first embodiment.

FIG. 2 and FIG. 6 are flowcharts illustrating the flow of processes in the image processing device 1 of FIG. 1.

Figure 3:
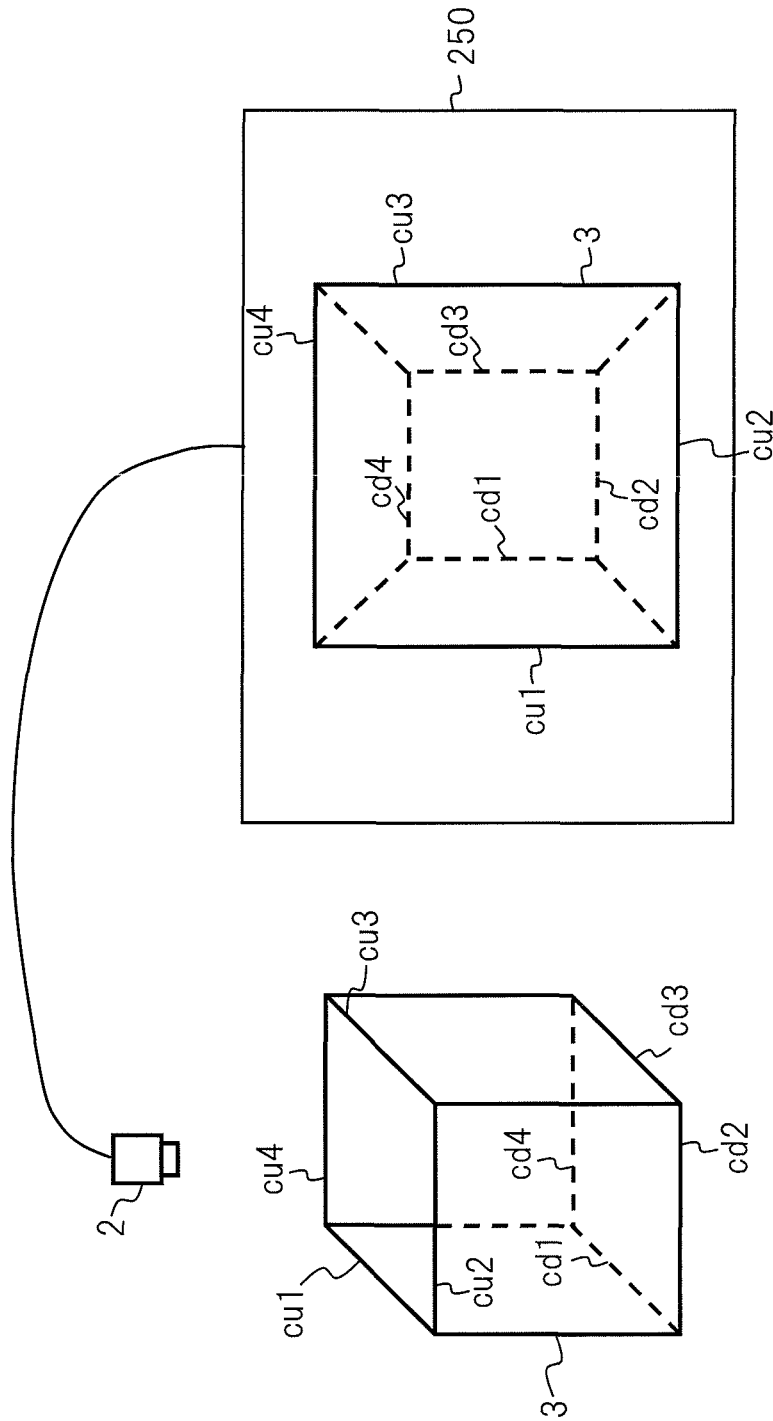
FIG. 3 is a diagram illustrating an image that is acquired when a container is photographed from above the edge part.

First, the flow of the processing steps SAt1 to SAt9 when teaching the reference data will be illustrated with reference to the flowchart of FIG. 2. In the step SAt1, the container position and posture are acquired. FIG. 3 is a diagram illustrating an image that is acquired when a container is photographed from above the edge part. As illustrated in FIG. 3, as for the method of acquiring the container position and posture, a method is used which detects the positions and postures of the four sides cu1 to cu4 constituting the edge upper surface of the container 3 from an image photographed by the fixed camera 2 using a method such as pattern matching, and calculates the container position and posture in the real space using the calibration data of the fixed camera 2. Note that, on a screen 250, the four sides cd1 to cd4 constituting the lower surface of the container 3 are displayed on the inner side of the four sides cu1 to cu4 of the edge upper surface. To determine the container position and posture in the real space from the position and posture of the edge upper surface of the container 3 on the image, the height Zc of the edge upper surface of the container 3 is needed, so that the height Zc is measured in advance. The method of detecting the container 3 from the image by pattern matching and the method of conversion from the container position and posture detected in the image to a container position and posture in the real space are known techniques and are not primary points of the present invention, and therefore detailed descriptions will be omitted. The detected container position and posture Cr can be represented by the following equation (representation by a homogeneous transformation matrix), which includes information about the position and posture of the container 3:

$$C_r = \begin{bmatrix} C_r \cdot r_{11} & C_r \cdot r_{12} & 0 & C_r \cdot x \\ C_r \cdot r_{21} & C_r \cdot r_{22} & 0 & C_r \cdot y \\ 0 & 0 & 1 & Zc \\ 0 & 0 & 0 & 1 \end{bmatrix}$$

$C_r \cdot x$ and $C_r \cdot y$ represent the position of the container 3, and $C_r \cdot r_{11}$ to $C_r \cdot r_{22}$ represent the posture of the container 3. In the next step SAt2, the acquired container position and posture $C_r$ is stored as the container reference position and posture.

Next, in the step SAt3, the workpiece 4 is placed in the container 3, and the reference workpiece size which is the size of the workpiece 4 is acquired from an image given by photographing the workpiece 4 by the fixed camera 2. To acquire the size of the workpiece 4, the workpiece 4 is detected by pattern matching, and the size of the workpiece 4 on the detected image assuming that the size of the workpiece 4 on the teach pattern image is 100 is acquired as the size of the workpiece 4. Note that the reference workpiece size may be input in advance.

Figure 4:
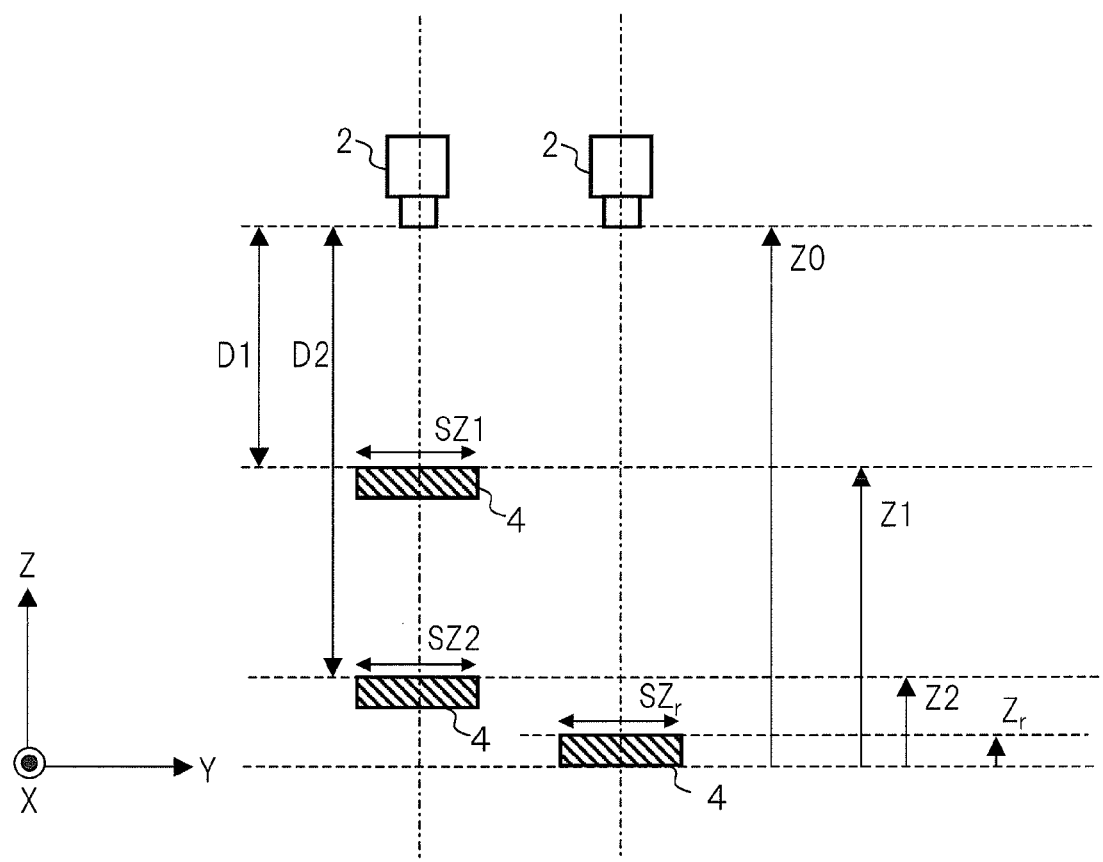
FIG. 4 is a diagram for illustrating a method of calculating the workpiece height.

Next, in the step SAt4, based on the reference workpiece size acquired in step SAt3, the workpiece reference height, which is the height of the workpiece 4, is calculated. The method of calculating the workpiece reference height will be illustrated with reference to FIG. 4. FIG. 4 is a diagram for illustrating method of calculating the workpiece height, seeing the relationship between the fixed camera 2 and the workpiece 4 from the x-axis direction. For the coordinate system to serve as the reference of the coordinates, one that has a Z axis that is directed vertically upward is assumed. To calculate the workpiece height, reference data in two places is needed. As the reference data, the size of the workpiece to be captured in the image photographed by the fixed camera 2 when the workpiece 4 is at the height of Z1 is SZ1, and the size to be captured in the image at the height of Z2 is SZ2. At this time, the size to be captured in the image is inversely proportional to the distance between the workpiece 4 and the fixed camera 2, so that the following equation holds.

$$SZ2/SZ1 = D1/D2 = (Z0-Z1)/(Z0-Z2) \qquad \text{(Equation 1)}$$

Z0 is the height of the fixed camera 2 and can be calculated by the following equation.

$$Z0 = (SZ2 \cdot Z2 - SZ1 \cdot Z1)/(SZ2-SZ1)$$

By contrast, when the size of the workpiece 4 placed in the container 3 is calculated to be $SZ_r$, the workpiece height $Z_r$, then can be calculated by the following equation.

$$Z_r = Z0 - (Z0-Z1)SZ1/SZ_r$$

In the next step SAt5, the workpiece height $Z_r$ calculated in the step SAt4 is stored as the workpiece reference height $ZA_r$.

Assuming that the workpiece that is present at the height of the container's edge upper surface lowers as is, vertically downward (in the negative direction along the Z axis), down to a predetermined height, the transformation to represent how the apparent position and posture on the image change will be referred as "appearance transformation on an image." In particular, one in which the end of lowering down is the workpiece reference height will be referred to as "reference appearance transformation on an image."

Figure 5:
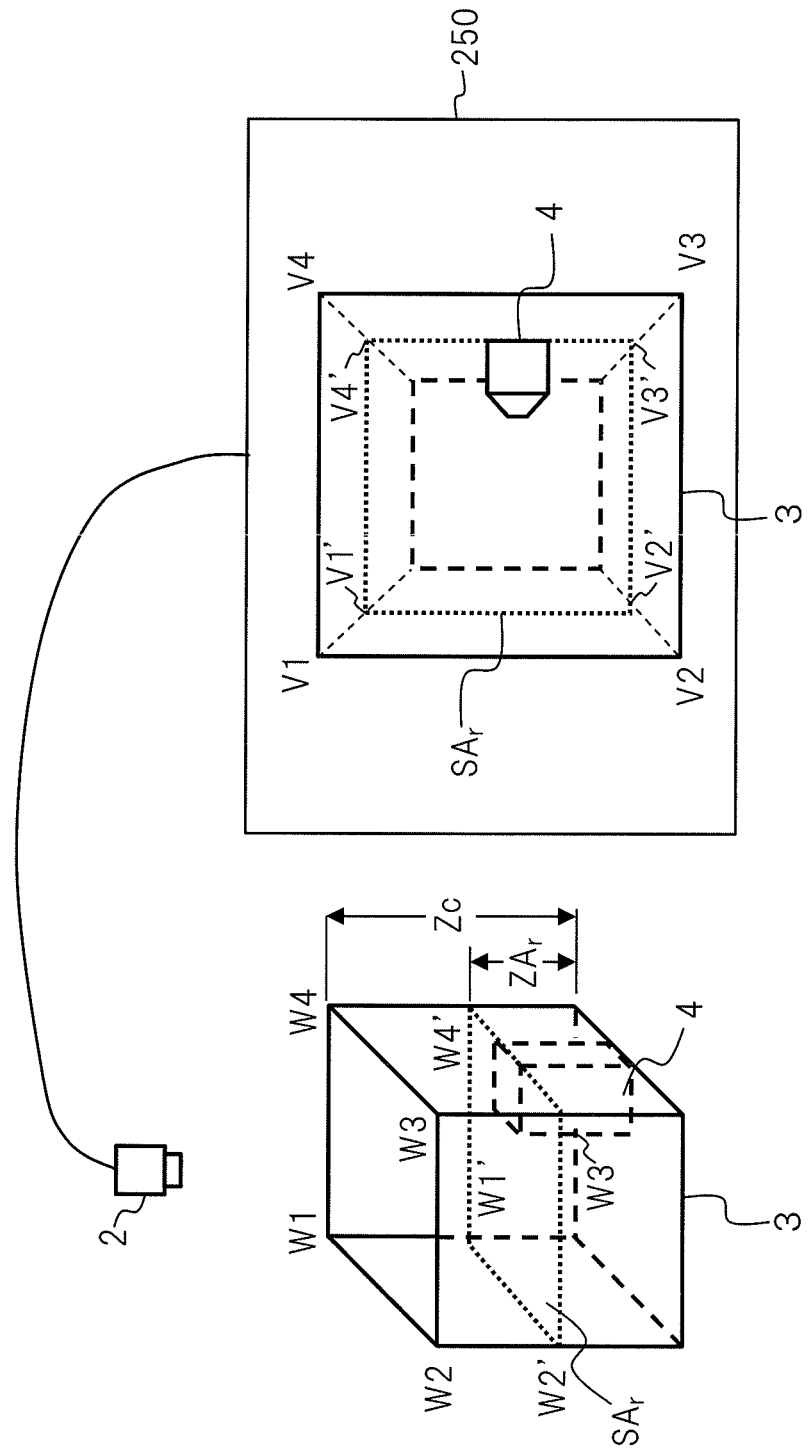
FIG. 5 is a diagram illustrating a method for setting up a reference search window, in the image processing device according to the first embodiment.

Next, in the step SAt6, the reference appearance transformation on the image is calculated. The method of calculating the reference appearance transformation on an image will be illustrated with reference to FIG. 5. FIG. 5 is a diagram illustrating a method for setting up a reference search window. In FIG. 5, the container 3 is displayed in the image 250 photographing the workpiece 4 by the fixed camera 2. First, three arbitrary points $V_i$ (i=1, 2, 3) on the image 250, represented by the following equation, are acquired. "vt" represents the image position in the vertical direction on the image, and "hz" represents the position in the horizontal direction on the image.

$$V_i = \begin{bmatrix} V_i \cdot vt \\ V_i \cdot hz \end{bmatrix} \quad (i = 1, 2, 3)$$

Next, using calibration data of the fixed camera 2, $V_i$ (i=1, 2, 3) are converted to the points $WA_i$ (i=1, 2, 3) on a surface where the planar height is Zc, in the real space.

$$WA_i = \begin{bmatrix} WA_i \cdot x \\ WA_i \cdot y \\ Zc \end{bmatrix} \quad (i = 1, 2, 3)$$

Next, the points $WA_i'$ (i=1, 2, 3), given by setting the workpiece reference height $ZA_r$ in the Z coordinate values of the points $WA_i$ (i=1, 2, 3), are created.

$$WA_i' = \begin{bmatrix} WA_i \cdot x \\ WA_i \cdot y \\ ZA_r \end{bmatrix} \quad (i = 1, 2, 3)$$

Next, using the calibration data of the fixed camera 2, the points $WA_i'$ (i=1, 2, 3) are converted to the points $VA_i'$ (i=1, 2, 3) on the image.

$$VA_i' = \begin{bmatrix} VA_i' \cdot vt \\ VA_i' \cdot hz \end{bmatrix} \quad (i = 1, 2, 3)$$

Next, a homogeneous transformation matrix $TA_r$ to make the points $V_i$ (i=1, 2, 3) be the points $VA_i'$ (i=1, 2, 3), is found.

$$\begin{bmatrix} VA_i' \cdot vt \\ VA_i' \cdot hz \\ 1 \end{bmatrix} = \begin{bmatrix} TA_r \cdot a & TA_r \cdot b & TA_r \cdot e \\ TA_r \cdot c & TA_r \cdot d & TA_r \cdot f \\ 0 & 0 & 1 \end{bmatrix} \begin{bmatrix} V_i \cdot vt \\ V_i \cdot hz \\ 1 \end{bmatrix} \quad (i = 1, 2, 3)$$

$$TA_r = \begin{bmatrix} TA_r \cdot a & TA_r \cdot b & TA_r \cdot e \\ TA_r \cdot c & TA_r \cdot d & TA_r \cdot f \\ 0 & 0 & 1 \end{bmatrix}$$

The above equations can be represented as follows.

$$\begin{bmatrix} V_1' \cdot vt \\ V_1' \cdot hz \\ V_2' \cdot vt \\ V_2' \cdot hz \\ V_3' \cdot vt \\ V_3' \cdot hz \end{bmatrix} = \begin{bmatrix} V_1 \cdot vt & V_1 \cdot hz & 0 & 0 & 1 & 0 \\ 0 & 0 & V_1 \cdot vt & V_1 \cdot hz & 0 & 1 \\ V_2 \cdot vt & V_2 \cdot hz & 0 & 0 & 1 & 0 \\ 0 & 0 & V_2 \cdot vt & V_2 \cdot hz & 0 & 1 \\ V_3 \cdot vt & V_3 \cdot hz & 0 & 0 & 1 & 0 \\ 0 & 0 & V_3 \cdot vt & V_3 \cdot hz & 0 & 1 \end{bmatrix} \begin{bmatrix} TA_r \cdot a \\ TA_r \cdot b \\ TA_r \cdot c \\ TA_r \cdot d \\ TA_r \cdot e \\ TA_r \cdot f \end{bmatrix}$$

$TA_r \cdot a$ to $TA_r \cdot f$ can be calculated by the following equations. Note that, in the following, the operator "x" represents the multiplication between matrices.

$$VM = \begin{bmatrix} V_1 \cdot vt & V_1 \cdot hz & 0 & 0 & 1 & 0 \\ 0 & 0 & V_1 \cdot vt & V_1 \cdot hz & 0 & 1 \\ V_2 \cdot vt & V_2 \cdot hz & 0 & 0 & 1 & 0 \\ 0 & 0 & V_2 \cdot vt & V_2 \cdot hz & 0 & 1 \\ V_3 \cdot vt & V_3 \cdot hz & 0 & 0 & 1 & 0 \\ 0 & 0 & V_3 \cdot vt & V_3 \cdot hz & 0 & 1 \end{bmatrix} \quad VM' = \begin{bmatrix} V_1' \cdot vt \\ V_1' \cdot hz \\ V_2' \cdot vt \\ V_2' \cdot hz \\ V_3' \cdot vt \\ V_3' \cdot hz \end{bmatrix}$$

$$\begin{bmatrix} TA_r \cdot a \\ TA_r \cdot b \\ TA_r \cdot c \\ TA_r \cdot d \\ TA_r \cdot e \\ TA_r \cdot f \end{bmatrix} = (VM^T \times VM)^{-1} \times VM^T \times VM'$$

The transformation matrix $TA_r$ that is found is stored as the reference appearance transformation matrix on the image, in the next step SAt7. As illustrated above, the reference appearance transformation matrix $TA_r$ is found using the workpiece reference height $ZA_r$.

In the next step SAt8, a reference search window $SA_r$ is set in the reference search window setting unit 1a, and, in the following step SAt9, stored in the reference search window storage unit 1b. As the reference search window $SA_r$ to set up, as illustrated in FIG. 5, it is preferable to set up a search window that is suitable to detect the workpiece 4 that is present at the workpiece reference height $ZA_r$. A search window that is set up to be able to detect the workpiece 4 when the container 3 is in container reference position and posture $C_r$ and the workpiece 4 is in the workpiece reference height $ZA_r$, as the reference search window $SA_r$. The reference search window $SA_r$ can be represented as a rectangle that includes the following four points AA to AD as vertices.

$$AA = \overrightarrow{APo}$$

$$AB = \overrightarrow{APo} + \overrightarrow{APx}$$

$$AC = \overrightarrow{APo} + \overrightarrow{APy}$$

$$AD = \overrightarrow{APo} + \overrightarrow{APx} + \overrightarrow{APy}$$

APo is a vector from the origin of the image to a corner of the search window, APx is an orientation vector along the long side of the rectangle from the corner, and APy is an orientation vector along the short side of the rectangle.

Figure 7:
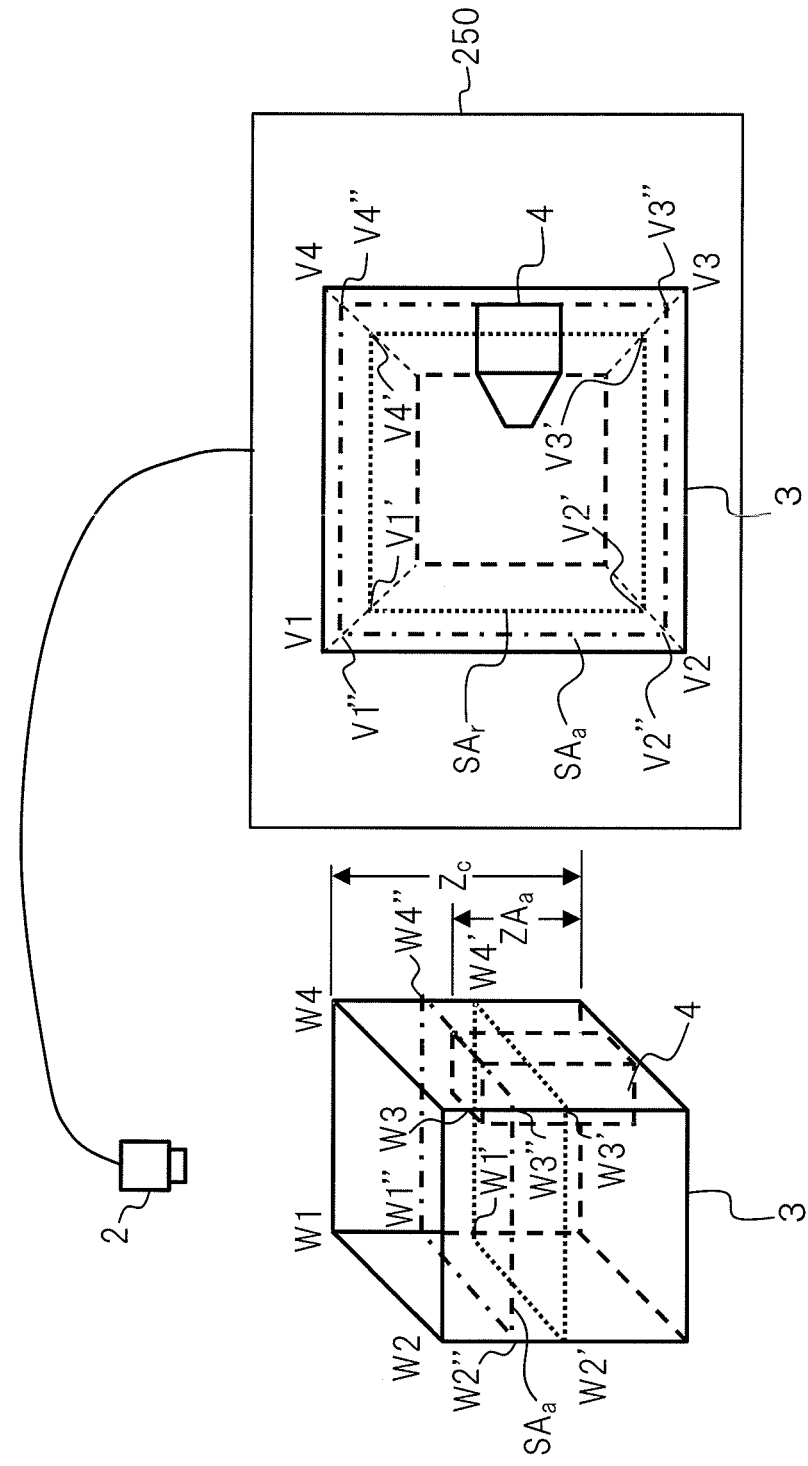
FIG. 7 is a diagram illustrating a method of setting up a search window, in the image processing device according to the first embodiment.

Next, the flow of processes upon workpiece detection (steps SAe1 to SAe9) will be illustrated with reference to FIG. 7, following the flowchart of FIG. 6.

First, in the step SAe1, the workpiece is detected using the reference search window, and the initial value of the workpiece size is acquired. By modifying equation 1, the initial value $SZ_{ini}$ of the workpiece size is calculated by the following equation. At this time, the relationship between the workpiece size $SZ_{in}$ and the workpiece height $Z_{ini}$ can be represented by the following equation.

$$SZ_{ini}=(Z0-Z1)/(Z0-Z_{ini})\cdot SZ1$$

Next, in the step SAe2, the container position and posture $C_a$ are acquired. As for the method of acquiring the container position and posture, the same method as in the step SAt1 (see FIG. 2) is used. The detected container position and posture $C_a$ are represented by the following equation.

$$C_a = \begin{bmatrix} C_a \cdot r_{11} & C_a \cdot r_{12} & 0 & C_a \cdot x \\ C_a \cdot r_{21} & C_a \cdot r_{22} & 0 & C_a \cdot y \\ 0 & 0 & 1 & Zc \\ 0 & 0 & 0 & 1 \end{bmatrix}$$

$C_a \cdot x$ and $C_a \cdot y$ represent the position of the container 3, and $C_a \cdot r_{11}$ to $C_a \cdot r_{22}$ represent the posture of the container 3.

Next, in the step SAe3, the workpiece height $ZA_a$ is calculated. The workpiece height $ZA_a$ is calculated by the same method as in the step SAt4 (see FIG. 2). As for the workpiece size to use to calculate the workpiece height $ZA_a$, the initial value of the workpiece size that is acquired in the step SAe1 is used when the workpiece is detected for the first time, and, following this, the workpiece size when the workpiece 4 was previously detected, acquired in the step SAe9, is used.

In the next step SAe4, an executing appearance transformation matrix $TA_a$ on the image is calculated. The detailed method of calculation is as follows.

First, the three points $V_i$ (i=1, 2, 3) on the image, used in the step SAt6, are re-converted into the three points $WA_i$ (i=1, 2, 3) on a surface, where the planar height is Zc, using calibration data of the fixed camera 2, in the real space.

$$WA_i = \begin{bmatrix} WA_i \cdot x \\ WA_i \cdot y \\ Zc \end{bmatrix} \quad (i = 1, 2, 3)$$

Next, the points $WA_i''$ (i=1, 2, 3), given by multiplying the points $WA_i$ (i=1, 2, 3) by the amount of displacement $C_0$ of the container 3 are calculated. The amount of displacement $C_0$ of the container 3 is given by the following equation, using the container position and posture $C_a$ and the container reference position and posture $C_r$.

$$WA_i'' = \begin{bmatrix} WA_i'' \cdot x \\ WA_i'' \cdot y \\ Zc \end{bmatrix} = C_o \begin{bmatrix} WA_i \cdot x \\ WA_i \cdot y \\ Zc \end{bmatrix} \quad (i = 1, 2, 3)$$

$$C_o = C_a \times C_r^{-1}$$

Next, the points $WA_i'''$ (i=1, 2, 3), where the workpiece height $ZA_a$ is set in the Z coordinate values of the points $WA_i'''$ (i=1, 2, 3), are created.

$$WA_i''' = \begin{bmatrix} WA_i'' \cdot x \\ WA_i'' \cdot y \\ ZA_a \end{bmatrix} \quad (i = 1, 2, 3, 4)$$

Next, the points $WA_i'''$ (i=1, 2, 3) are converted into the points $VA_i'''$ (i=1, 2, 3) on the image using the calibration data of the fixed camera 2.

$$VA_i''' = \begin{bmatrix} VA_i''' \cdot vt \\ VA_i''' \cdot hz \end{bmatrix} \quad (i = 1, 2, 3)$$

Next, a homogeneous transformation matrix $TA_a$ to make the points $V_i$ (i=1, 2, 3) be $VA_i'''$ (i=1, 2, 3) is found. The same method as in the step SAt6 (see FIG. 2) is used for the calculation. The homogeneous transformation matrix $TA_a$ that is found is the executing appearance transformation matrix $TA_a$.

$$\begin{bmatrix} VA_i''' \cdot vt \\ VA_i''' \cdot hz \\ 1 \end{bmatrix} = \begin{bmatrix} TA_a \cdot a & TA_a \cdot b & TA_a \cdot e \\ TA_a \cdot c & TA_a \cdot d & TA_a \cdot f \\ 0 & 0 & 1 \end{bmatrix} \begin{bmatrix} V_i \cdot vt \\ V_i \cdot hz \\ 1 \end{bmatrix} \quad (i = 1, 2, 3)$$

$$TA_a = \begin{bmatrix} TA_a \cdot a & TA_a \cdot b & TA_a \cdot e \\ TA_a \cdot c & TA_a \cdot d & TA_a \cdot f \\ 0 & 0 & 1 \end{bmatrix}$$

As illustrated above, the executing appearance transformation matrix $TA_a$ is found using the container position and posture $C_a$, the container reference position and posture $C_r$, and the workpiece height $ZA_a$.

In the next step SAe5, the amount of adjustment $TA_0$ of the search window is calculated. The amount of adjustment $TA_0$ of the search window is calculated by the following equation, using the reference appearance transformation matrix $TA_r$ calculated in the step SAt6, and the executing appearance transformation matrix $TA_a$ calculated in the step SAe4.

$$TA_o = TA_a \times TA_r^{-1} = \begin{bmatrix} TA_o \cdot a & TA_o \cdot b & TA_o \cdot e \\ TA_o \cdot c & TA_o \cdot d & TA_o \cdot f \\ 0 & 0 & 1 \end{bmatrix}$$

Given that the reference appearance transformation matrix $TA_r$ is found using the workpiece reference height $ZA_r$ and the executing appearance transformation matrix $TA_a$ is found using the container position and posture $C_a$, the container reference position and posture $C_r$ and the workpiece height $ZA_a$, the amount of adjustment $TA_0$ of the search window can be calculated from the container reference position and posture $C_r$, the workpiece reference height $ZA_r$, the container position and posture $C_a$, and the workpiece height $ZA_a$.

In the next step SAe6, the search window $SA_a$ to use in the next workpiece detection is set. To find the search window $SA_a$, the vertices AA' to AD', which correspond to AA to AD set in the step SAt8, are found from the reference search window $SA_r$ and the amount of adjustment $TA_0$ of the search window. The processes of the steps SAe5 and SAe6 are carried out in the search window calculation unit 1i.

$$\overrightarrow{APo'} = \begin{bmatrix} TA_o \cdot a & TA_o \cdot b \\ TA_o \cdot c & TA_o \cdot d \end{bmatrix} \overrightarrow{APo} + \begin{bmatrix} TA_o \cdot e \\ TA_o \cdot f \end{bmatrix}$$

$$\overrightarrow{APx'} = \begin{bmatrix} TA_o \cdot a & TA_o \cdot b \\ TA_o \cdot c & TA_o \cdot d \end{bmatrix} \overrightarrow{APx}$$

$$\overrightarrow{APy'} = \begin{bmatrix} TA_o \cdot a & TA_o \cdot b \\ TA_o \cdot c & TA_o \cdot d \end{bmatrix} \overrightarrow{APy}$$

$$AA' = \overrightarrow{APo'}$$

$$AB' = \overrightarrow{APo'} + \overrightarrow{APx'}$$

$$AC' = \overrightarrow{APo'} + \overrightarrow{APy'}$$

$$AD' = \overrightarrow{APo'} + \overrightarrow{APx'} + \overrightarrow{APy'}$$

In the next step SAe7, the detection of the workpiece 4 is executed using the search window $SA_a$ set in the step SAe6. The workpiece 4 is detected using a method such as pattern matching. The pattern matching method is not a primary point of the present invention and therefore will not be illustrated.

In the next step SAe8, whether or not the detection of the workpiece 4 has succeeded is determined. When the workpiece detection succeeds (T: True), the step moves on to the step SAe9, and the size of the detected workpiece 4 is acquired. On the other hand, when the detection of the workpiece 4 fails (F: Fault), the workpiece detection process is finished. It is equally possible then to return to the step SAe2, so as to change the parameters to be able to detect the workpiece for photographing an image when the workpiece detection fails.

Figure 8A:
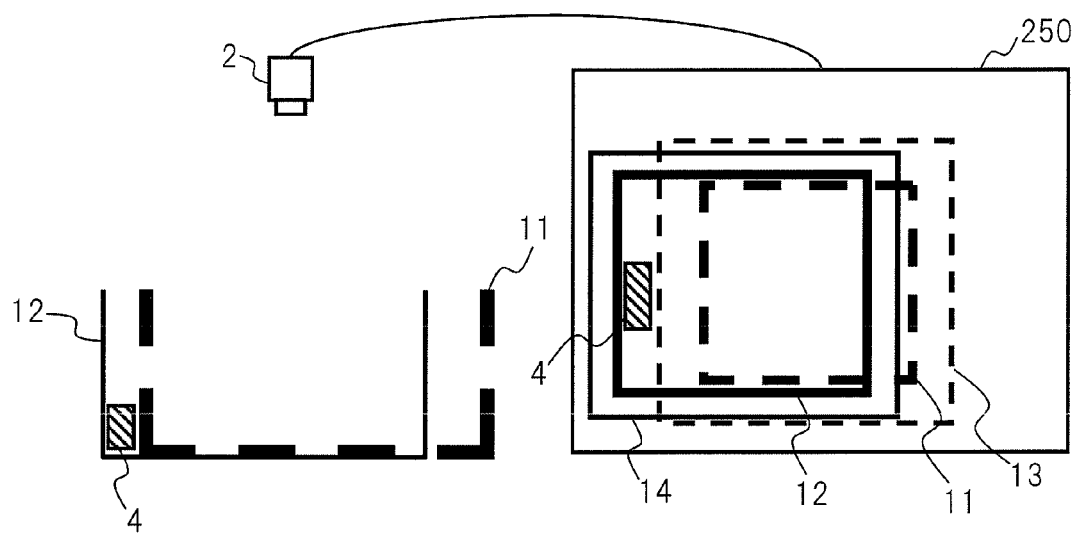
FIGS. 8A and 8B are diagrams illustrating an example of a search window that is automatically adjusted using the amount of change of the position and posture of a container and the height of a workpiece, according to the first embodiment.
Figure 8B:
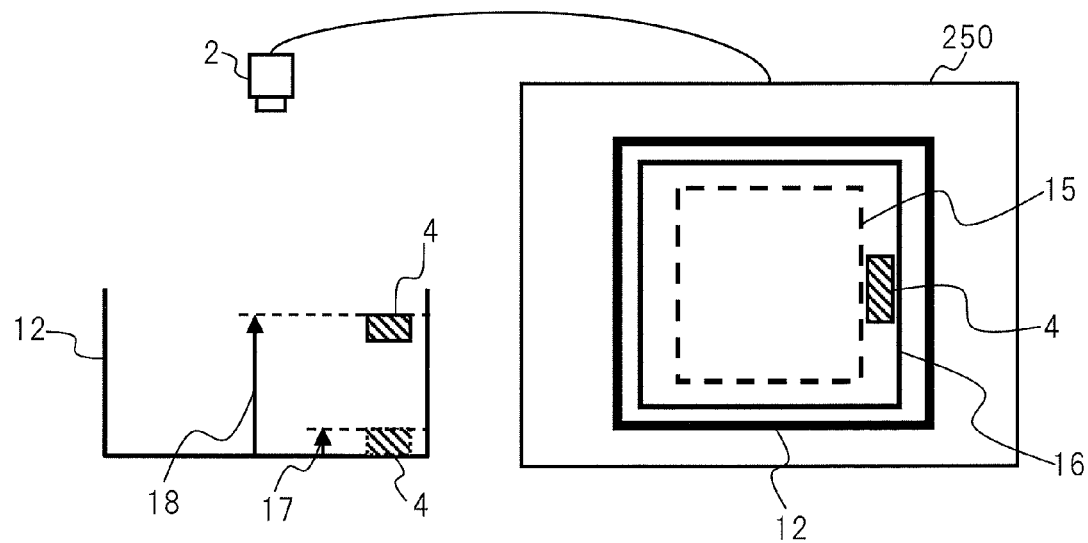

Next, with reference to FIGS. 8A and 8B, how the function of adequately adjusting the search window to use when detecting the workpiece 4 by the fixed camera 2 that is fixed and set above the container, is effective against problems that, for example, the workpiece is not found in the search window due to displacement of the container, unwanted objects are captured in the search window and cause misdetection, the search window is too large and the detection consumes additional time, and so on, will be illustrated. FIG. 8A and FIG. 8B are diagrams each illustrating an example of a search window that is automatically adjusted using the container position and posture and the workpiece height. In FIG. 8A, the effect of adjusting the search window in accordance with the amount of displacement of the container will be illustrated. When the container is in the container reference position and posture 11, the reference search window 13 is set. Later, when, for example, the position and posture of the container are displaced to the executing container position and posture 12 during the work of replacing the container, the reference search window 13 cannot cover the whole range inside the container 11, and therefore the workpiece 4 cannot be found. Then, when the size of the search window is increased, for example, unwanted objects are captured in the search window and cause misdetection, and the search window is too large and the detection consumes additional time, etc. With the present invention, the workpiece 4 can be detected using the search window 14 that is adjusted in accordance with the amount of displacement of the container, so that it is possible to prevent problems where, for example, the workpiece is not found in the search window, unwanted objects are captured in the search window and cause misdetection, the search window is too large and the detection consumes additional time, and so on, from occurring.

Next, the effect of adjusting the search window in accordance with the workpiece height, in FIG. 8B, will be illustrated. When the workpiece height is at the workpiece reference height 17, the reference search window 15 is set. Later, in the workpiece detection, when the workpiece at the executing workpiece height 18 is detected, the workpiece 4 cannot be found in the reference search window 15. Then, when the search window is made bigger unnecessarily, for example, misdetection occurs, and the search window is too large and the detection consumes additional time. With the present invention, the workpiece can be detected using the search window 16 that is adjusted in accordance with the workpiece height, so that it is possible to prevent for example, the workpiece is not found in the search window, unwanted objects are captured in the search window and cause misdetection, the search window is too large and the detection consumes additional time, etc.

Figure 9:
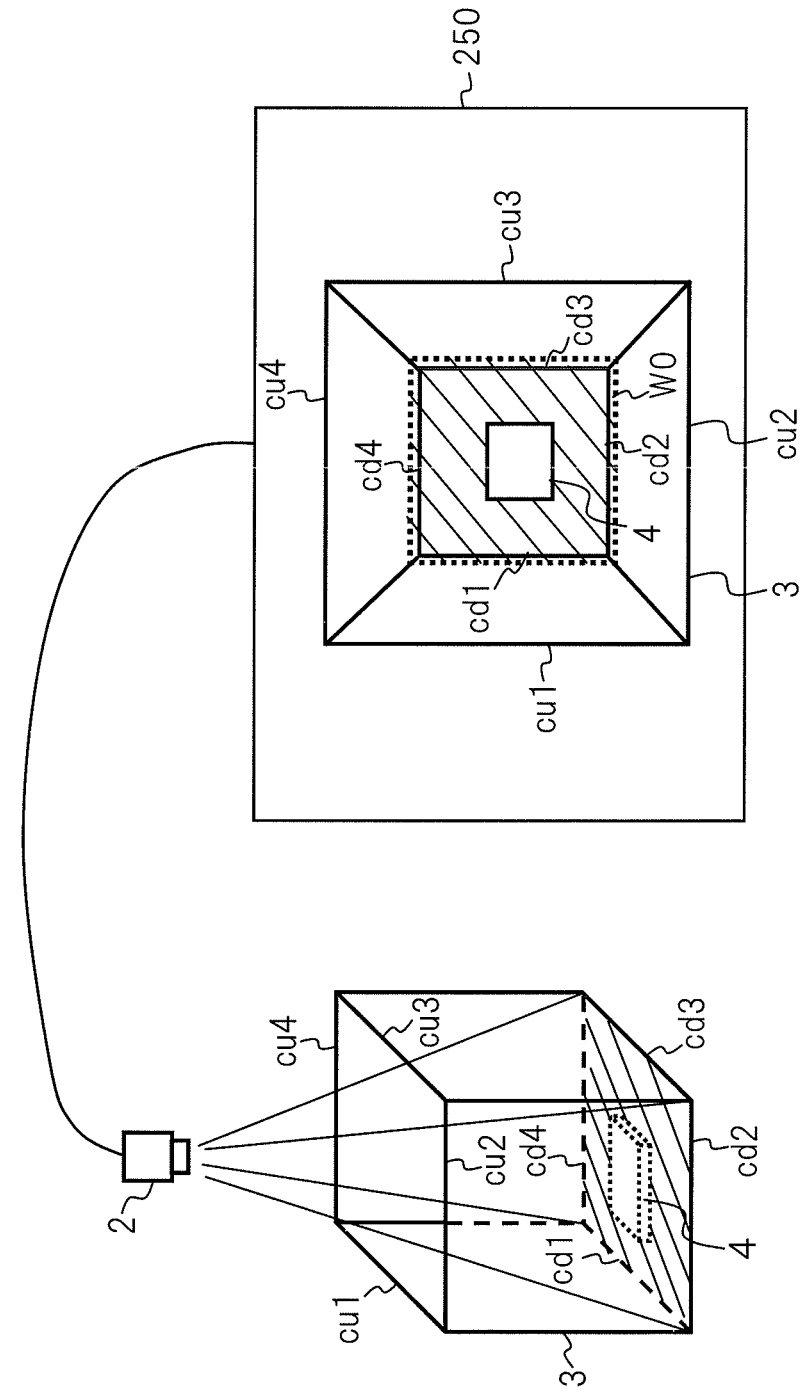
FIG. 9 is diagram illustrating a search window that is set when the uppermost part of a workpiece is located near the bottom surface of a container.
Figure 10:
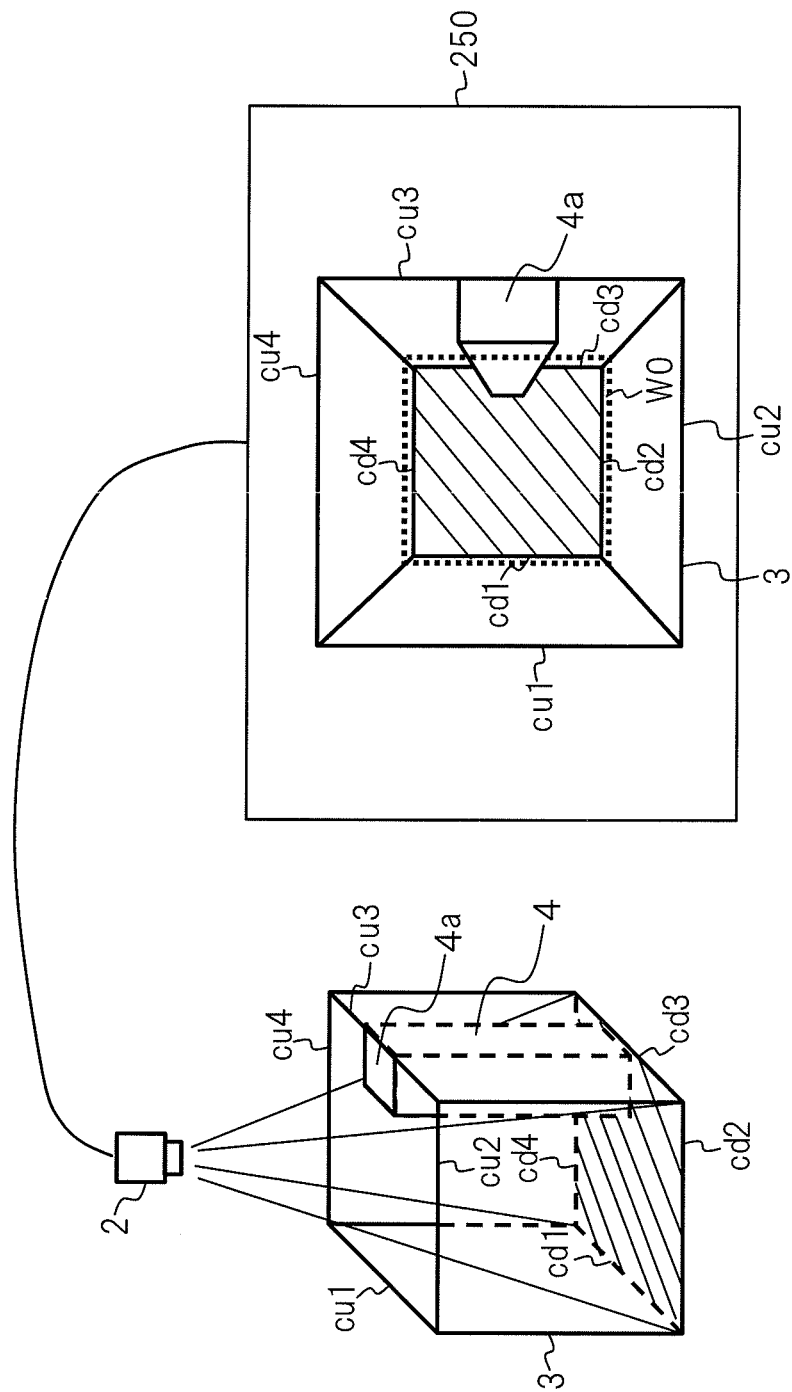
FIG. 10 is diagram illustrating an image captured when the uppermost part of a workpiece is located near the edge upper surface of a container.
Figure 11:
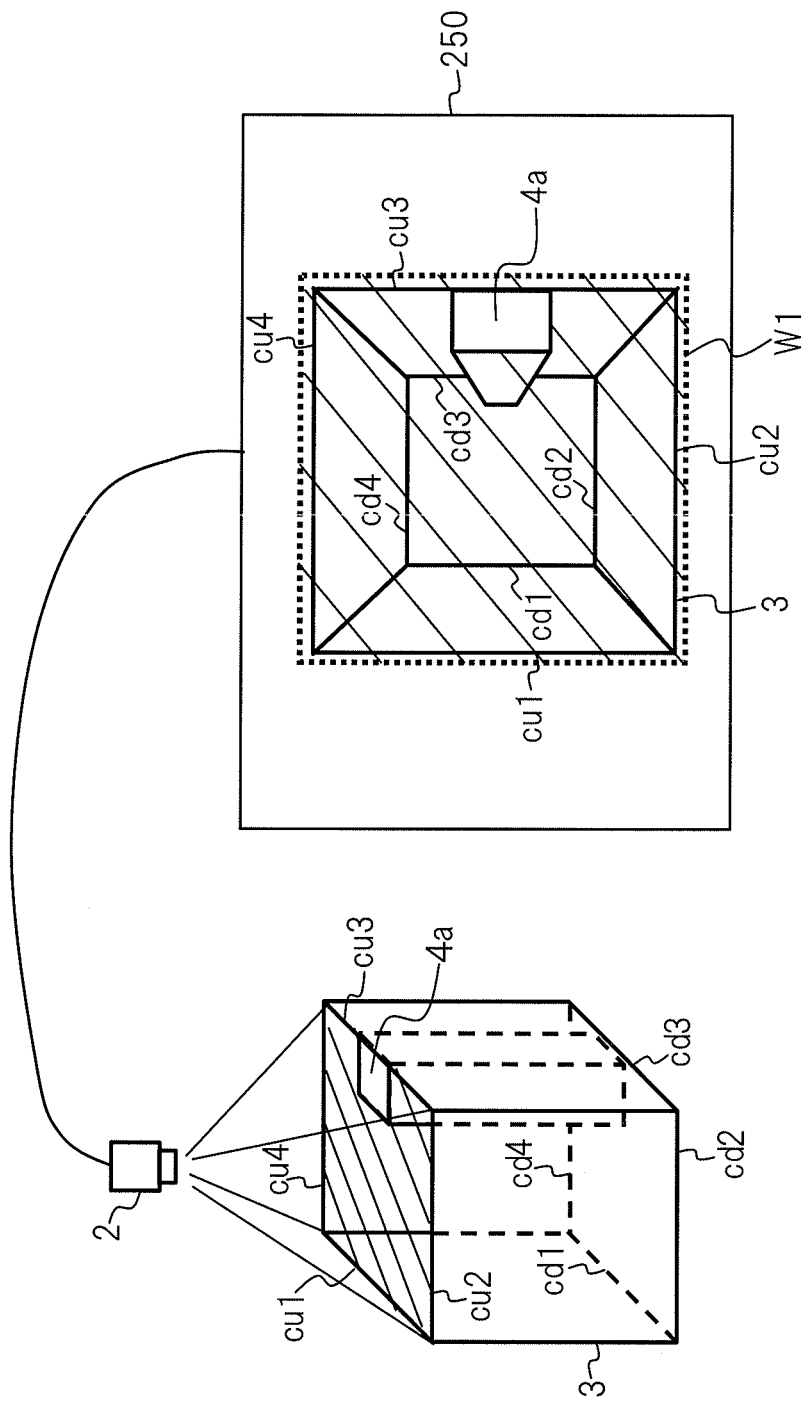
FIG. 11 is diagram illustrating a search window that is set when the uppermost part of a workpiece is located near the edge upper surface of a container.

The relationship between the height of the workpiece and the position of the search window will be illustrated using FIG. 9 to FIG. 11. FIG. 9 illustrates a search window W0 when the uppermost part of the workpiece 4 is present near the bottom surface of the container 3. On the image 250 photographed by the fixed camera 2, the four sides cd1 to cd4, constituting the bottom surface part of the container 3, are displayed on the inner side, and the search window W0 can be set near the four sides cd1 to cd4 constituting the bottom surface part of the container 3.

Next, the situation will be considered where, as illustrated in FIG. 10, the height of the workpiece 4 reaches near the four sides cu1 to cu4 constituting the edge upper surface part of the container. In this case, the upper surface part 4a of the workpiece 4 on the image 250 is present outside the search window W0, and therefore, when the search window W0 is used, the workpiece 4 cannot be detected.

Consequently, with the present invention, the size of the search window is changed according to the height of the workpiece 4. FIG. 11 illustrates an image when the size of the search window is changed. When the size of the search window W0 is set to a search window W1, which includes the four sides cu1 to cu4 constituting the edge upper surface part of the container 3, it is possible to include the upper surface part 4a of the workpiece 4 in the search window W1, so that the workpiece 4 can be detected.

(Embodiment 2)

Figure 12:
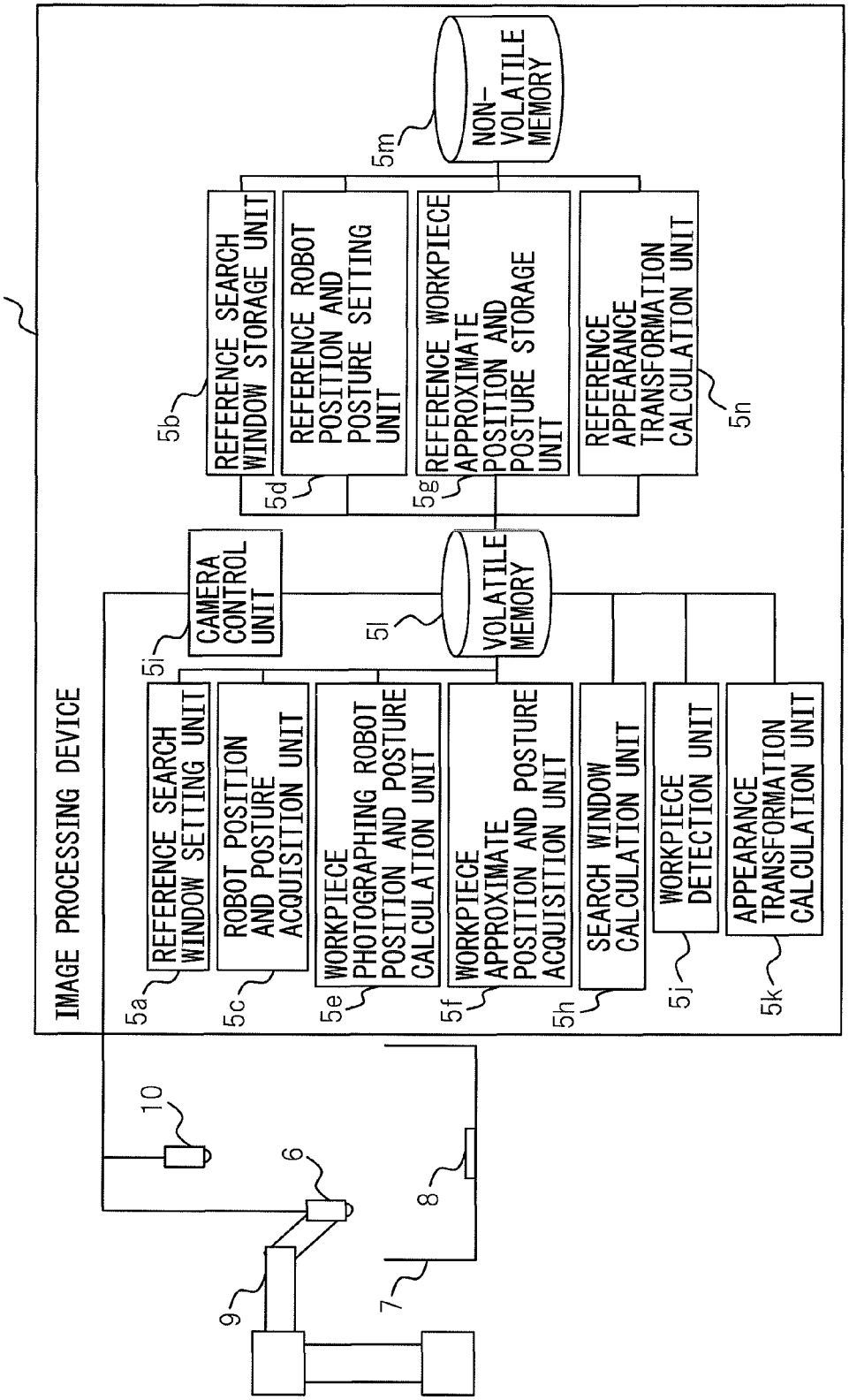
FIG. 12 is a diagram illustrating a schematic configuration of an image processing device which has a function of automatically adjusting a search window using the amount of change of the position and posture of a robot and an approximate position and posture of a workpiece, according to a second embodiment.

Next, an image processing device according to the second embodiment of the present invention will be illustrated. FIG. 12 is a diagram illustrating overall configuration of an image processing device 5 according to the second embodiment. The container 7 accommodates a workpiece 8.

The fixed camera 10 that is fixed and set above the container 7 and the hand camera 6 that is set at the tip of the robot 9 are connected to the camera control unit 5i inside the image processing device 5. The image processing device 5 photographs the workpiece 8 by the hand camera 6 mounted in the robot 9, sets a search window as the range to detect the workpiece 8 in the image acquired by the photographing, and detects the workpiece 8 inside the search window in the image. The image processing device 5 includes a robot position and posture acquisition unit 5c as a means for acquiring the position and posture of the robot 9 when photographing the workpiece 8 as the robot position and posture, a robot position and posture calculation unit 5e as a means for finding the robot position and posture to photograph the workpiece and photograph the workpiece, a reference robot position and posture setting unit 5d as a means for setting the reference robot position and posture for setting the position and posture to be the reference for the robot 9, a workpiece approximate position and posture acquisition unit 5f as a means for acquiring the approximate position and posture of the workpiece from the image photographed by the fixed camera 10, a reference workpiece approximate position and posture storage unit 5g as a means for storing the approximate position and posture of the workpiece to be the reference, as the reference workpiece approximate position and posture of the workpiece, a reference search window setting unit 5a as a means for setting a search window that can be detected when the robot 9 is in the reference robot position and posture and the workpiece 8 is placed in the reference workpiece approximate position and posture, as a reference search window, a search window calculation unit 5h as a means for calculating, when detecting the approximate position and posture of the workpiece 8 and photographing the workpiece 8 by the fixed camera 10 that is mounted in the robot 9, the amount of adjustment of the search window from the reference robot position and posture, the robot position and posture when photographing, the reference workpiece approximate position and posture, and the approximate position and posture of the workpiece 8, and calculate the search window to use when detecting the workpiece 8 by the hand camera 6 that is mounted on the robot 9, from the reference search window and the amount of adjustment of the search window. The reference search window, the reference robot position and posture, and the reference workpiece approximate position and posture are stored in advance when each reference data is taught. The search window is calculated by way of adjusting the reference search window using the reference robot position and posture and the reference workpiece approximate position and posture that are stored when the reference data is taught, and the robot position and posture and the workpiece approximate position and posture that are acquired when the workpiece is detected.

Figure 13:
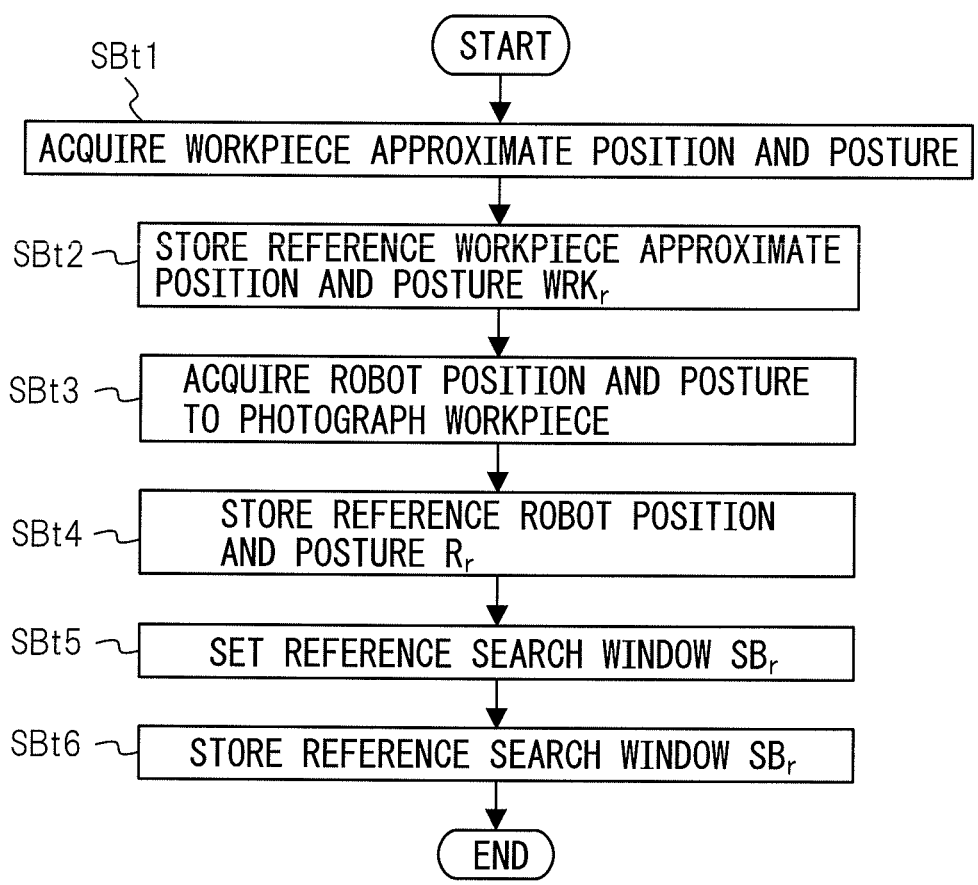
FIG. 13 is a flowchart illustrating a preferable example of a process of detecting a workpiece by automatically adjusting a search window using the amount of change of the position and posture of a robot and an approximate position and posture of a workpiece, according to the second embodiment.
Figure 14:
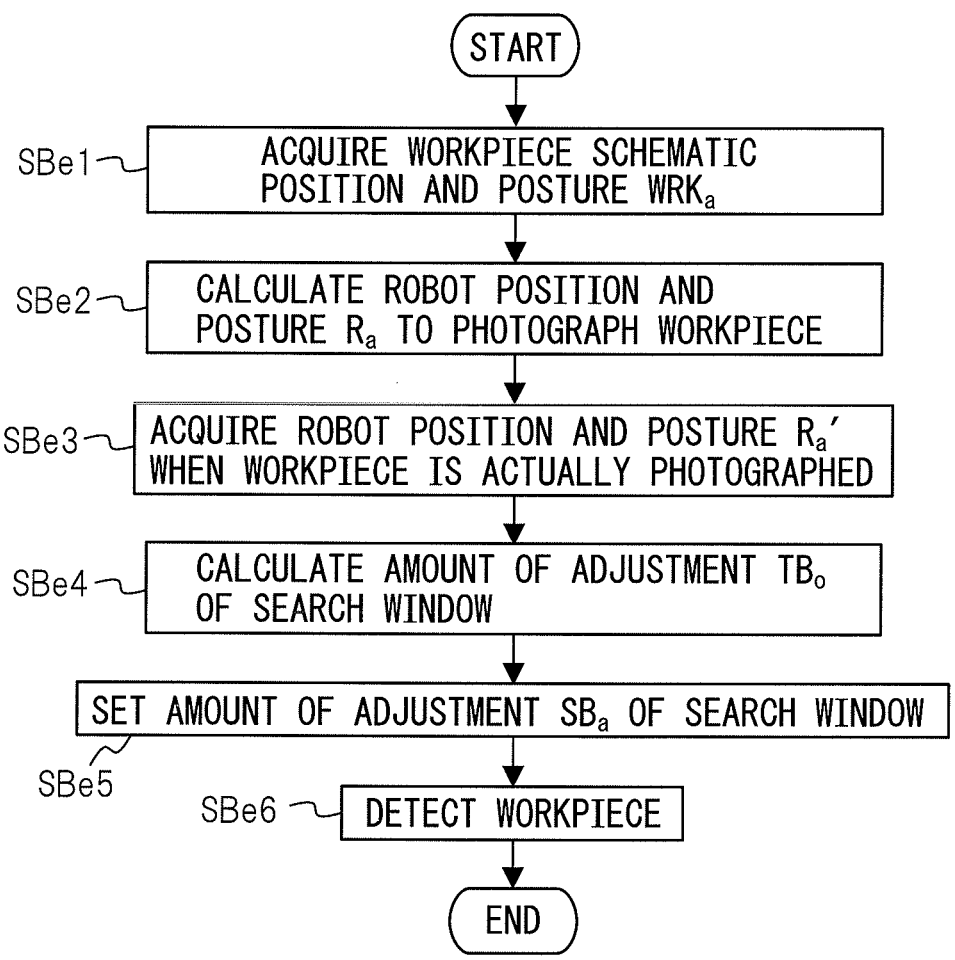
FIG. 14 is a flowchart illustrating a preferable example of a process of detecting a workpiece by automatically adjusting a search window using the amount of change of the position and posture of a robot and an approximate position and posture of a workpiece.

FIG. 13 and FIG. 14 are flowcharts illustrating the flow of processes in the image processing device 5 of FIG. 12.

First, the flow of processes when teaching the reference data (steps SBt1 to SBt6) will be illustrated with reference to the flowchart of FIG. 13. In the step SBt1, the workpiece 8 is placed in the container 7, and the workpiece approximate position and posture are acquired. As for the method of acquiring the workpiece approximate position and posture, a method is used which detects the workpiece position and posture on the image using a method such as pattern matching, from the image photographed by the fixed camera 10, and converts the workpiece position and posture on the image into a workpiece approximate position and posture in the real space, using calibration data of the fixed camera 10. Information to indicate in a surface of what height in the real space the workpiece is present is needed to convert the position and posture of the workpiece on the image into a workpiece approximate position and posture in the real space, and therefore a surface of the workpiece height $ZB_r$ is used. The workpiece height $ZB_r$ is calculated by the same method as in the step SAt4 (see FIG. 2). The method of detecting the workpiece from the image by pattern matching and the method of converting the workpiece position and posture on the image in the real space into a workpiece approximate position and posture in the real space are known methods and not primary points of the present invention, and therefore illustrations will be omitted. In the next step SBt2, the workpiece approximate position and posture acquired in the step SBt1 are stored as the reference workpiece approximate position and posture $WRK_r$. The reference workpiece approximate position and posture $WRK_r$ can be represented by the following equation (representation by a homogeneous transformation matrix), which includes the position and posture of the workpiece.

$$WRK_r = \begin{bmatrix} WRK_r \cdot r_{11} & WRK_r \cdot r_{12} & 0 & WRK_r \cdot x \\ WRK_r \cdot r_{21} & WRK_r \cdot r_{22} & 0 & WRK_r \cdot y \\ 0 & 0 & 1 & ZB_r \\ 0 & 0 & 0 & 1 \end{bmatrix}$$

$WRK_r \cdot x$ and $WRK_r \cdot y$ represent the position of the workpiece 8, and $WRK_r \cdot r_{11}$ to $WRK_r \cdot r_{22}$ represent the posture of the workpiece 8.

Next, in the step SBt3, the robot position and posture to photograph the workpiece 8 are acquired. The robot position and posture are set such that, when the workpiece 8 is photographed by the hand camera 6, the workpiece 8 is captured in the center of the image. In the next step SBt4, the robot position and posture acquired in the step SBt3 are stored as the reference robot position and posture $R_r$. The reference robot position and posture $R_r$ can be represented by the following equation (representation by a homogeneous transformation matrix).

$$R_r = \begin{bmatrix} R_r \cdot r_{11} & R_r \cdot r_{12} & R_r \cdot r_{13} & R_r \cdot x \\ R_r \cdot r_{21} & R_r \cdot r_{22} & R_r \cdot r_{23} & R_r \cdot y \\ R_r \cdot r_{31} & R_r \cdot r_{32} & R_r \cdot r_{33} & R_r \cdot z \\ 0 & 0 & 0 & 1 \end{bmatrix}$$

$R_r \cdot x$, $R_r \cdot y$, and $R_r \cdot z$ represent the position of the robot 9, and $R_r \cdot r_{11}$ to $R_r \cdot r_{33}$ represent the posture of the robot 9.

In the next step SBt5, the reference search window $SB_r$ is set in the reference search window setting unit 5a, and, in the following step SBt6, stored in the reference search window storage unit 5b. As the reference search window $SB_r$ to be set then, the operator may designate an arbitrary area in the image photographed by the fixed camera 10, but it is preferable to set a search window that surrounds the workpiece 8 so that the workpiece 8 can be detected when the robot 9 is in the reference robot position and posture $R_r$. The reference search window $SB_r$ can be represented as a rectangle having the following four points BA to BD as vertices.

$$BA = \overrightarrow{BPo}$$

$$BB = \overrightarrow{BPo} + \overrightarrow{BPx}$$

$$BC = \overrightarrow{BPo} + \overrightarrow{BPy}$$

$$BD = \overrightarrow{BPo} + \overrightarrow{BPx} + \overrightarrow{BPy}$$

BPo is a vector from the origin of the image to a corner of the search window, BPx is an orientation vector along the long side of the rectangle from the corner, and BPy is an orientation vector along the short side of the rectangle.

Next, the flow of the processing steps SBe1 to SBe6 when detecting the workpiece will be illustrated following the flowchart of FIG. 14. First, in the step SBe1, an approximate position and posture of the workpiece 8 placed in the container 7 are acquired form an image photographed by the fixed camera 10. As for the method of acquiring a workpiece approximate position and posture from the image photographed by the fixed camera 10, the same method as in the step SBt1 (see FIG. 13) is used. Assuming that the workpiece height is $ZB_a$, then, the detected workpiece approximate position and posture $WRK_a$ can be represented by the following equation, which includes the position and posture of the workpiece.

$$WRK_a = \begin{bmatrix} WRK_a \cdot r_{11} & WRK_a \cdot r_{12} & 0 & WRK_a \cdot x \\ WRK_a \cdot r_{21} & WRK_a \cdot r_{22} & 0 & WRK_a \cdot y \\ 0 & 0 & 1 & ZB_a \\ 0 & 0 & 0 & 1 \end{bmatrix}$$

$WRK_a \cdot x$ and $WRK_a \cdot y$ represent the position of the workpiece 8, and $WRK_a \cdot r_{11}$ to $WRK_a \cdot r_{22}$ represent the posture of the workpiece 8.

Next, in the step SBe2, the position and posture of the robot 9 when the workpiece 8 is photographed by the hand camera 6 are calculated as the robot position and posture $R_a$. The robot position and posture $R_a$ to photograph the workpiece 8 by the hand camera 6 are acquired by the following equation, using the reference workpiece approximate position and posture $WRK_r$, stored in the step SBt2, the reference robot position and posture $R_r$ to photograph the reference workpiece, stored in the step SBt4, and the workpiece approximate position and posture $WRK_a$ acquired in the step SBe1. The amount of displacement $WRK_0$ of the workpiece approximate position and posture is found by the following equation, using the workpiece approximate position and posture $WRK_a$ and the reference workpiece approximate position and posture $WRK_r$.

$$WRK_0 = WRK_a \times WRK_r^{-1}$$

$$R_a = WRK_0 \times R_r$$

This calculation is carried out in the robot position and posture calculation unit 5e that photographs the workpiece.

Next, in the step SBe3, the robot position and orientation $R_a'$ when the workpiece 8 is actually photographed by the hand camera 6 are acquired. This acquisition takes place in the robot position and posture acquisition unit 5c. The robot position and posture can be represented by the following equation.

$$R_a' = \begin{bmatrix} R_a' \cdot r_{11} & R_a' \cdot r_{12} & R_a' \cdot r_{13} & R_a' \cdot x \\ R_a' \cdot r_{21} & R_a' \cdot r_{22} & R_a' \cdot r_{23} & R_a' \cdot y \\ R_a' \cdot r_{31} & R_a' \cdot r_{32} & R_a' \cdot r_{33} & R_a' \cdot z \\ 0 & 0 & 0 & 1 \end{bmatrix}$$

$R_a' \cdot x$, $R_a' \cdot y$, and $R_a' \cdot Z$ represent the position of the robot 9, and $R_a' \cdot r_{11}$ to $R_a' \cdot r_{33}$ represent the posture of the robot 9. Although $R_a'$ is usually the same as $R_a$, displacement into the position and posture of $R_a$ causes the hand of the robot 9 and the container 7 to interfere with each other, so that the situation might occur where, to avoid interference, the position and posture in which the robot 9 photographs the workpiece 8 by the hand camera 6 have to be changed, and different values are taken at that time. In other words, when the robot 9 interferes with the container 7 which accommodates the workpiece 8, the robot position and posture $R_a$ is set to a position and posture $R_a'$ where the robot 9 and the container 7 do not interfere with each other.

In the next step SBe4, the amount of adjustment $TB_0$ of the search window is calculated from the robot position and posture $R_a$ and the robot position and posture $R_a'$. First, in the same way as in the step SAt6 (see FIG. 2) and the step SAe4 (see FIG. 6), three arbitrary points $V_i$ (i=1, 2, 3) on the image of the hand camera 6 are prepared. Next, the three points $V_i$ (i=1, 2, 3) on the image are converted into three points $WB_i$ (i=1, 2, 3), where the surface height in the real space is the workpiece height $ZB_a$ acquired in the step SBe1, using calibration data of the hand camera 6.

$$WB_i = \begin{bmatrix} WB_i \cdot x \\ WB_i \cdot y \\ ZB_a \end{bmatrix} \quad (i = 1, 2, 3)$$

Next, the points $WB_i'$ (i=1, 2, 3), given by multiplying the points $WB_i$ (i=1, 2, 3) by the amount of displacement $R_0$ of the robot 9, are calculated. The amount of displacement of the robot is found by $R_0$ represented in the following equation.

Next, the points $WB_i'$ (i=1, 2, 3) are converted into the points $VB_i'$ (i=1, 2, 3) on the image, using the calibration data of the hand camera 6.

$$VB_i' = \begin{bmatrix} VB_i' \cdot vt \\ VB_i' \cdot hz \end{bmatrix} \quad (i = 1, 2, 3)$$

Next, the amount of adjustment $TB_0$ of the search window to make the points $V_i$ (i=1, 2, 3) be the points $VB_i'$ (i=1, 2, 3) is calculated. The calculation is carried out by the same method as in the step SAt6 (see FIG. 2) and the step SAe4 (see FIG. 6).

$$\begin{bmatrix} VB_i' \cdot vt \\ VB_i' \cdot hz \\ 1 \end{bmatrix} = \begin{bmatrix} TB_o \cdot a & TB_o \cdot b & TB_o \cdot e \\ TB_o \cdot c & TB_o \cdot d & TB_o \cdot f \\ 0 & 0 & 1 \end{bmatrix} \begin{bmatrix} V_i \cdot vt \\ V_i \cdot hz \\ 1 \end{bmatrix} \quad (i = 1, 2, 3, 4)$$

$$TB_o = \begin{bmatrix} TB_o \cdot a & TB_o \cdot b & TB_o \cdot e \\ TB_o \cdot c & TB_o \cdot d & TB_o \cdot f \\ 0 & 0 & 1 \end{bmatrix}$$

As illustrated above, the amount of adjustment $TB_0$ of the search window is found from the obot position and posture $R_a$ ad the robot position and posture $R_a'$.

In the next step SBe5, the search window $SB_a$ to use in the next workpiece detection is set. To be more specific, the vertices BA' to BD' corresponding to BA to BD set in the step SBt3 (see FIG. 13) have only to be found. The processes of the steps SBe4 and SBe5 are carried out in the search window calculation unit 5h.

$$\overrightarrow{BPo'} = \begin{bmatrix} TB_o \cdot a & TB_o \cdot b \\ TB_o \cdot c & TB_o \cdot d \end{bmatrix} \overrightarrow{BPo} + \begin{bmatrix} TB_o \cdot e \\ TB_o \cdot f \end{bmatrix}$$

$$\overrightarrow{BPx'} = \begin{bmatrix} TB_o \cdot a & TB_o \cdot b \\ TB_o \cdot c & TB_o \cdot d \end{bmatrix} \overrightarrow{BPx}$$

$$\overrightarrow{BPy'} = \begin{bmatrix} TB_o \cdot a & TB_o \cdot b \\ TB_o \cdot c & TB_o \cdot d \end{bmatrix} \overrightarrow{BPy}$$

$$BA' = \overrightarrow{BPo'}$$

$$BB' = \overrightarrow{BPo'} + \overrightarrow{BPx'}$$

$$BC' = \overrightarrow{BPo'} + \overrightarrow{BPy'}$$

$$BD' = \overrightarrow{BPo'} + \overrightarrow{BPx'} + \overrightarrow{BPy'}$$

In the next step SBe6, the workpiece is detected using the search window $SB_a$ set in the step SBe5. The workpiece is detected using a method such as pattern matching. The method of pattern matching is not a primary point of the present invention, and therefore will not be illustrated.

The above embodiment is designed such that the workpiece 8 that is randomly stacked in the container is detected by the hand camera 6 mounted in the robot 9, so that the fixed camera 10 is set, a workpiece approximate position and posture are acquired from the image photographed by the fixed camera 10, and, based on the workpiece approximate position and posture and the reference robot position and posture, the robot position and posture in which the robot 9 photographs the workpiece 8 by the hand camera 6 are found. However, when the robot position and posture to photograph the workpiece 8 are determined in advance, it is obvious that the present invention applicable without detecting the workpiece 8 using the fixed camera 10 or the image photographed by the fixed camera 10.

Figure 15A:
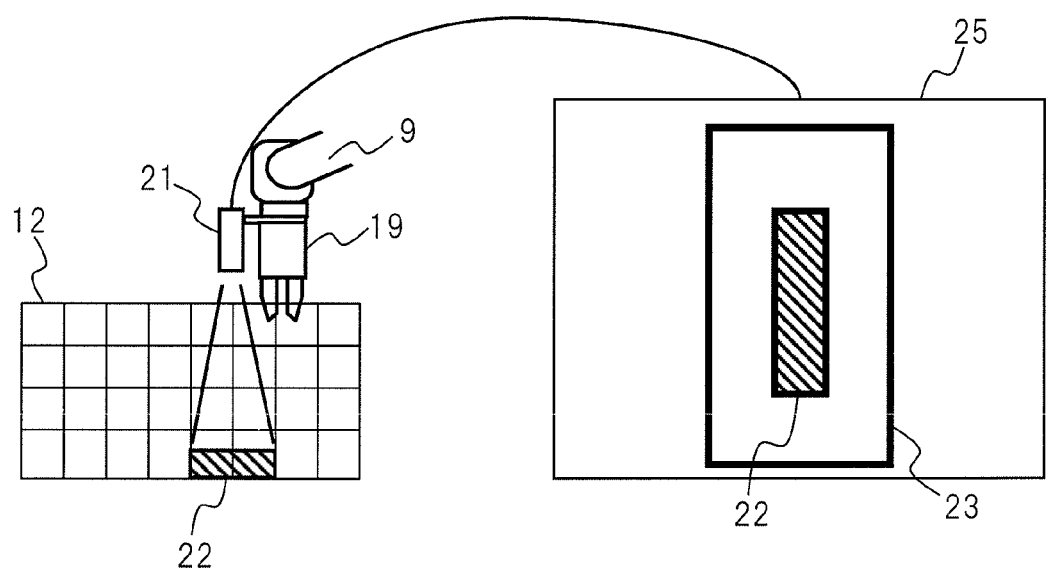
FIGS. 15A and 15B are diagrams illustrating an example of a search window that is automatically adjusted using the amount of change of the position and posture of a robot and an approximate position and posture of a workpiece, according to the second embodiment.
Figure 15B:
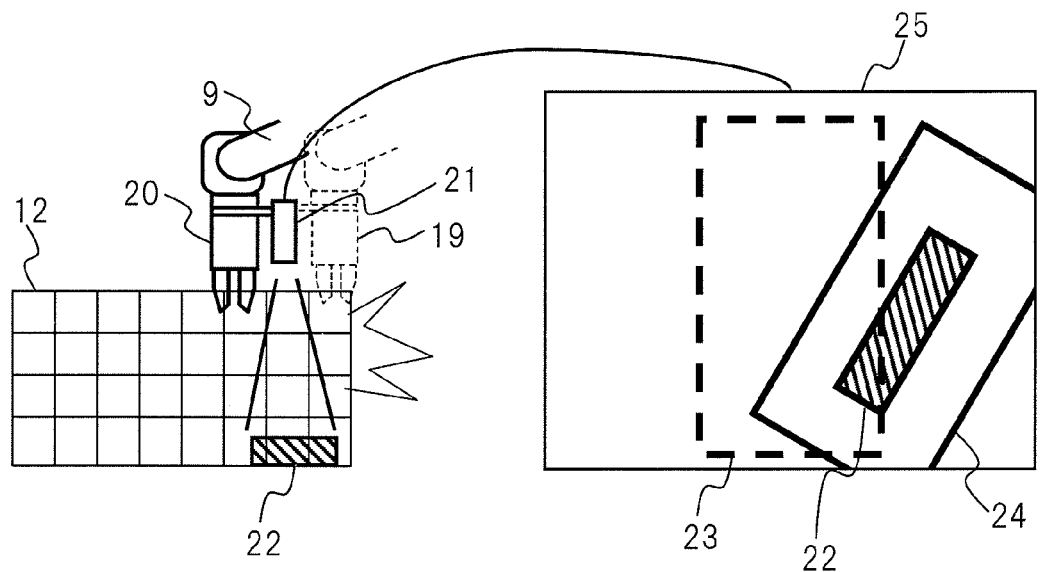

Although problems occur where, for example, the workpiece is not found in the search window when the robot moves to avoid interference, unwanted objects are captured in the search window and cause misdetection, the search window is too large and the detection consumes additional time, and so on, when detecting the workpiece 8 by the hand camera 6 mounted at the tip of the robot, how the present invention is effective to solve the problems will be illustrated using FIGS. 15A and 15B. FIG. 15A illustrates an image 25, which photographs a workpiece 22 by a hand camera 21 as the robot 9 mounting the hand camera 21 moves to the robot position and posture 19 to photograph the workpiece 22, and a search window 23. In this way, when the workpiece 22 can be photographed in a robot position and posture set in advance, the workpiece 22 can be included in the search window 23, and problems that the workpiece 22 cannot be found and misdetection is caused, do not occur. However, as illustrated in FIG. 15B, in a case where the hand of the robot 9 and the container 12 interfere with each other when the robot 9 mounting the hand camera 21 moves to the robot position and posture 19 to photograph the workpiece 22, the robot mounting the hand camera 21 photographs the workpiece in the robot position and posture 20 where interference is avoided. Then, the workpiece cannot be included in the search window 23, causing the problem that the workpiece 22 cannot be found. When a measure of making the search window 23 bigger in advance is taken in order to solve the problem that the workpiece 22 cannot be found, new problems might occur where unwanted objects are captured in the search window and cause misdetection and the search window is too large and the detection consumes additional time. Consequently, with the present invention, the workpiece is detected using a search window 24 that is adjusted in accordance with the difference between the robot position and posture 23 to photograph the workpiece 22 that are set in advance, and the robot position and posture in which the workpiece 22 is actually photographed. By this means, the workpiece 22 can be included in the search window, thereby preventing the problem that the workpiece cannot be found, from occurring. Furthermore, since an unnecessarily big search window has no linger to be set in advance, it is also possible to prevent problems where unwanted objects are captured in the search window and cause misdetection and the search window is too large and the detection consumes additional time and so on, from occurring.

Although image processing devices according to the present invention have been illustrated in the above illustrations taking examples where a workpiece is used as an object, the object is by no means limited to a workpiece. Furthermore, although image processing devices according to the present invention have been illustrated taking examples where a container is used as an accommodating means, the accommodating means is by no means limited to a container.

What is claimed is:

1. An image processing device that photographs an image by a camera, sets a search window in the image as a range to detect a workpiece that is accommodated in a container from the image, and detects the workpiece, wherein after the workpiece is detected, a robot is moved to handle the workpiece, the image processing device comprising:
   a container reference position and posture setting unit for setting a container reference position and posture;
   a workpiece reference height setting unit for setting a workpiece reference height to be a reference for the workpiece, when the workpiece is placed in the container;
   a reference search window setting unit for adjusting a search window that is set such that the workpiece can be detected when the container is in the container reference position and posture and the workpiece is at the workpiece reference height, as a reference search window;
   a container position and posture acquisition unit for acquiring a container position and posture when the workpiece is photographed;
   a workpiece height calculation unit for estimating a workpiece height when the workpiece is photographed;
   an executing appearance transformation calculation unit for finding an executing appearance transformation on an image from the container position and posture and the workpiece height, wherein the executing appearance transformation represents a change of the position and posture of the image for a given container position and posture and a given workpiece height;
   a reference appearance transformation storage unit for storing a reference appearance transformation on an image which is calculated from the container reference position and posture and the workpiece reference height, wherein the reference appearance transformation on the image represents a change of the position and posture of the image in which the container is present at the container reference position and posture and the workpiece is present at the workpiece reference height;
   a search window calculation unit for adjusting an amount of adjustment of the search window from the executing appearance transformation and the reference appearance transformation, the workpiece reference height, the container position and posture, and the workpiece height, and calculating the search window from the reference search window and the amount of adjustment of the search window; and
   a workpiece detection unit for detecting the workpiece from the image using the calculated search window.

2. The image processing device according to claim 1, wherein the container reference position and posture or the container position and posture are calculated based on an image acquired by photographing the container by the camera.

3. The image processing device according to claim 1, wherein the workpiece reference height or the workpiece height is calculated based on a size of the workpiece in an image acquired by photographing the workpiece by the camera.

4. An image processing device that photographs an image by a camera, sets a search window in the image as a range to detect a workpiece from the image, and detects the workpiece, wherein after the workpiece is detected, robot is moved to handle the workpiece, the image processing device comprising:

a reference robot position and posture setting unit for setting a reference robot position and posture;

a reference search window setting unit for adjusting a search window that is set such that the workpiece can be detected when the robot is in the reference robot position and posture, as a reference search window;

a robot position and posture acquisition unit for acquiring a robot position and posture when the workpiece is photographed;

a reference appearance transformation calculation unit for finding a reference appearance transformation on an image from the reference robot position and posture, wherein the reference appearance transformation represents a change of the position and posture of the image in which the robot is present at the reference robot position and posture;

an executing appearance transformation calculation unit for finding an executing appearance transformation on the image on an image from the robot position and posture when the workpiece is photographed, wherein the executing appearance transformation represents a change of the position and posture of the image for a given robot position and posture;

a search window calculation unit for calculating an amount of adjustment of the search window from the appearance transformation and the reference appearance transformation, and for calculating a search window from the reference search window and the amount of adjustment of the search window; and a workpiece detection unit for detecting the workpiece from the image using the calculated search window.

5. The image processing device according to claim 4, wherein, when the robot interferes with a container that accommodates the workpiece, the robot position and posture are set in a position and posture where the robot and the container do not interfere with each other.

\* \* \* \* \*